US011838598B2

(12) United States Patent
Rafferty et al.

(10) Patent No.: US 11,838,598 B2
(45) Date of Patent: *Dec. 5, 2023

(54) LIVE CAPTION FEEDBACK SYSTEMS AND METHODS

(71) Applicant: Capital One Services, LLC, McLean, VA (US)

(72) Inventors: Galen Rafferty, Mahomet, IL (US); Austin Walters, Savoy, IL (US); Jeremy Edward Goodsitt, Champaign, IL (US); Vincent Pham, Champaign, IL (US); Mark Watson, Urbana, IL (US); Reza Farivar, Champaign, IL (US); Anh Truong, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/398,469

(22) Filed: Aug. 10, 2021

(65) Prior Publication Data
US 2021/0368243 A1 Nov. 25, 2021

Related U.S. Application Data

(63) Continuation of application No. 16/828,993, filed on Mar. 25, 2020, now Pat. No. 11,134,317.

(51) Int. Cl.
*H04N 21/488* (2011.01)
*H04N 21/2187* (2011.01)
*H04N 21/43* (2011.01)

(52) U.S. Cl.
CPC ..... *H04N 21/4884* (2013.01); *H04N 21/2187* (2013.01); *H04N 21/4307* (2013.01)

(58) Field of Classification Search
CPC .......... H04N 21/4884; H04N 21/2187; H04N 21/4307; H04N 21/41407;
(Continued)

(56) References Cited

U.S. PATENT DOCUMENTS 8,692,936 B2 4/2014 Polumbus et al.
9,622,052 B1 4/2017 Pan
(Continued)

OTHER PUBLICATIONS

International Search Report and Written Opinion in related PCT Application No. PCT/US21/20716, dated May 20, 2021.

*Primary Examiner* — Loi H Tran
(74) *Attorney, Agent, or Firm* — TROUTMAN PEPPER HAMILTON SANDERS LLP; Christopher J. Forstner; John A. Morrissett

(57) ABSTRACT

System and devices for live captioning events is disclosed. The system may receive event calendar data and a first plurality of caption files and preselect a first caption file based on the event calendar data. The system may then access an audiovisual recorder of a user device, and receive a first feedback from the recorder. The system may then determine whether the first caption file matches the first feedback. When there is a match, the system may determine a first synchronization between the caption file and the feedback. When there is no match, the system may determine if there is a match with a second caption file of the first plurality of caption files and determine a second synchronization. When the second caption file does not match, the system may receive at least a third caption file over a mobile network and determine a third synchronization for display.

21 Claims, 12 Drawing Sheets

(58) Field of Classification Search
CPC ......... H04N 21/43074; H04N 21/4325; H04N 21/4334; H04N 21/4394; H04N 21/44008; H04N 21/4622; H04N 21/278
USPC ........................................................ 348/468
See application file for complete search history.

(56) References Cited

U.S. PATENT DOCUMENTS

| | | |
|---|---|---|
| 10,091,543 B2 | 10/2018 | Diggins |
| 10,225,625 B2 | 3/2019 | Homyack et al. |
| 2010/0306249 A1 | 12/2010 | Hill et al. |
| 2012/0033825 A1 | 2/2012 | Zinn, II et al. |
| 2012/0192227 A1 | 7/2012 | Fleischman et al. |
| 2014/0129942 A1 | 5/2014 | Rathod |
| 2014/0358632 A1 | 12/2014 | Graff et al. |
| 2017/0098153 A1* | 4/2017 | Mao ..................... G06N 3/0454 |
| 2017/0116578 A1* | 4/2017 | Hadatsuki ............. G01C 21/343 |
| 2019/0028772 A1 | 1/2019 | Perez |
| 2019/0069013 A1* | 2/2019 | Abed ................. H04N 21/2353 |
| 2019/0387263 A1 | 12/2019 | Xu et al. |

\* cited by examiner

LIVE CAPTION FEEDBACK SYSTEMS AND METHODS

CROSS REFERENCE TO RELATED APPLICATIONS

This application is a continuation of, and claims priority under 35 U.S.C. § 120 to, U.S. patent application Ser. No. 16/828,993, filed Mar. 25, 2020, the entire contents of which is fully incorporated herein by reference.

FIELD OF INVENTION

The present disclosure relates to systems and methods for captioning live events, and more particularly to systems and methods for identifying a live feedback and providing a caption file synchronized with the live feedback.

BACKGROUND

Concertgoers, play-enthusiasts, and operagoers all share a common problem. Although there exist large public databases of open-source caption files having captions for many common musicals, plays, operas, concerts, etc., it is prohibitively difficult for a user to find the correct open-source caption file, preload it to his or her device prior to the event, and then upon attending the event, determine a synchronization between the event and the caption file.

Current systems require a patron of a live event to manually scour the internet for public databases containing caption files, determine a correct caption file, and manually download the caption file. The trouble doesn't stop there, because once the patron arrives at the live event, he or she must manually determine a synchronization between the selected caption file and the live event, distracting from the enjoyment of the live event. In some cases, it may be impossible for the patron to determine a synchronization between the caption file and the event, because the preselected caption file may be incorrect.

Conveniently live captioning events can be difficult for a number of reasons. First, a user has to remember which events he or she is attending and attempt to manually scour a plethora of public databases to find an appropriate caption file. Even if the right caption file is identified, there still remains the difficulty of determining whether the particular caption file is associated with the correct version of a performance. For example, a user's attempt to synchronize a caption file for "All Along the Watchtower" as originally performed by Bob Dylan to a performance of Hendrix's version of the same song may cause synchronization issues. Additionally, manually determining a synchronization between the caption file and a performance is both difficult to achieve and ultimately distracting for the user. Finally, current systems and methods for determining the proper caption file and synchronizing the caption file with the performance are very data intensive, requiring users to upload large audio and video files in order to determine a synchronization.

Accordingly, there is a need for systems and methods that proactively determine which version of a plurality of open-source caption files will most closely match a live event planned to be attended by a user and, in response to receiving an audiovisual feedback from the live event, determine a synchronization between the caption file and the performance. Additionally, there is a further need for such a system to react to interruptions to the live performance by pausing captioning, and for providing alternative caption files when it is determined that there may be a better match between the live performance and another caption file. There is also a need for systems and methods that limit the amount of bandwidth necessary for a successful implementation of a live-captioning system. The present disclosure is directed to this and other considerations.

SUMMARY

Examples of the present disclosure comprise systems and methods for captioning live events.

Consistent with the disclosed embodiments, various methods and systems are disclosed. In an embodiment, a system performing a method for live captioning an event is disclosed. The method may include receiving event calendar data including (i) information associated with a first event being attended by a user of the system (e.g., date, time, location, etc. of an upcoming concert) and (ii) event metadata (e.g., similarity scores for related events, such as another concert date from a particular concert tour, the similarity score indicative of inter-compatibility of a respective caption file between the related events) associated with the event being attended. The method may include receiving, from one or more public databases over a wireless network, open-source caption file(s) associated with the first event being attended by the user. The method may include preselecting a caption file from among the number of received open-source caption files. The method may include accessing an audiovisual recorder of the user's device, and receiving a live-streaming feedback (e.g., an audio clip, a video clip, or both) from the audiovisual recorder. The method may include, responsive to receiving the feedback, determining whether at least a portion of the preselected caption file matches the feedback beyond a predetermined threshold. When the portion of the first caption file matches the feedback, the method may include determining a synchronization between the first caption file and the feedback and displaying the first caption file on the user device without accessing a mobile network. When there is no match between the first caption file and the feedback, the method may include determining whether a second caption file of the received caption files matches the first feedback. In response to determining that there is a match between the second caption file and the first feedback, the method may include determining a synchronization between the second caption file and the first feedback. The method may include providing the second caption file to the user device without accessing a mobile network (e.g., because the second caption file is already stored locally). In response to determining that there is no match between the second open source caption file of the received caption files, the method may include receiving, over a mobile network, at least a third open source caption file associated with the event being attended by the user. The method may include identifying at least a portion of the third open source caption file that matches the first feedback beyond the predetermined threshold and determining a synchronization between the third open source caption file and the first feedback. The method may further include providing, for display on the user device, the third caption file.

In yet another embodiment, a system performing a method of live captioning an event is disclosed. The method may include receiving event calendar data (e.g., date, time, location, etc., of an upcoming concert) including information associated with an event being attended by a user and event metadata associated with that event (e.g., a similarity score indicating a similarity between the respective event and a related event). The method may include receiving a number of open source caption files from one or more public databases. The method may include preselecting a caption file of the number of caption files based on the event metadata. The method may include accessing an audiovisual recorder of the user device and receiving a live-streaming first feedback (e.g., an audio clip, a video clip, etc.) from the audiovisual recorder. In response to receiving the first feedback, the method may include determining that at least a portion of the caption file matches the first feedback, and determining a first synchronization between the caption file and the first feedback. The method may include causing the user device to display the caption file. The method may include receiving a live-streaming interruption from the audiovisual recorder. In response to the user device receiving the interruption, the method may include pausing captioning of the first event. The method may include receiving a live-streaming second feedback from the audiovisual recorder. In response to receiving the second feedback, the method may include determining that at least a portion of the caption file matches the second feedback. The method may include determining a second synchronization between the caption file and the second feedback and causing the user device to display the caption file.

Further features of the disclosed design, and the advantages offered thereby, are explained in greater detail hereinafter with reference to specific examples illustrated in the accompanying drawings, wherein like elements are indicated be like reference designators.

BRIEF DESCRIPTION OF THE DRAWINGS

Reference will now be made to the accompanying drawings, which are not necessarily drawn to scale, are incorporated into, and constitute a portion of, this disclosure, illustrate various implementations and aspects of the disclosed technology and, together with the description, serve to explain the principles of the disclosed technology. In the drawings.

DETAILED DESCRIPTION

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1A:
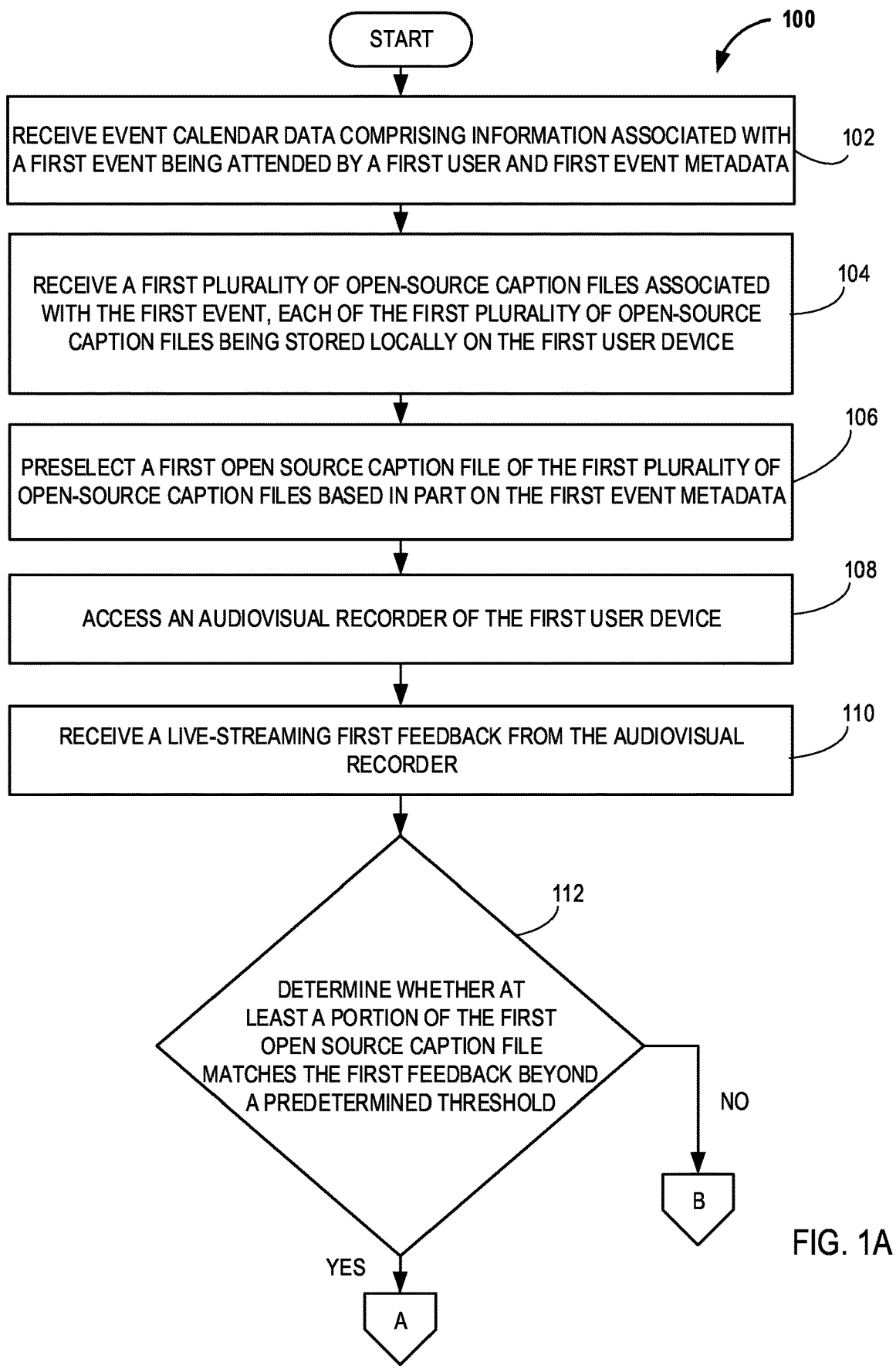
FIG. 1A-1D are flowcharts of a method for live captioning with a live caption feedback system based on a received live-streaming first feedback from an audiovisual recorder, in accordance with some examples of the present disclosure.

FIG. 1A-1D are flowcharts of an exemplary method for live captioning with a live caption feedback system based on a received live-streaming first feedback from an audiovisual recorder. Although steps in method 100 are described as being performed by a system (e.g., a system 400 as described in more detail with respect to FIGS. 4-5), a person of ordinary skill in the art would understand that some or all of the steps of method 100 may be performed by one or more devices of system 400 (e.g., a first user device 430, as described in more detail with respect to FIGS. 4-5). As shown in FIG. 1A, in step 102 of method 100, the system may receive event calendar data from either a user device (e.g., the first user device) or from a first financial service provider with which the first user maintains a financial account (e.g., financial service provider 450, described in more detail with respect to FIGS. 4-5). The event calendar data may include information associated with a first event being attended by a first user and first event metadata. For example, the event calendar data may include information indicating that a user has purchased tickets for a particular live performance. The first event metadata may include information indicating the existence of related events having a high similarity to the first event. For example, an off-Broadway performance of the musical, Cats, may have event metadata indicating a correlation between the off-Broadway Cats rendition and a Broadway rendition of Cats. This event metadata may allow the system to improve live caption synchronization for the Broadway rendition based on feedback obtained from the off-Broadway rendition of Cats. The event metadata may also include a similarity score indicative of the predetermined similarity between an event and open-source caption files available to the system via a plurality of public databases.

In step 104, the system may receive a first plurality of open-source caption files associated with the first event. Each of the first plurality of open-source caption files may be stored locally on the first user device. The first plurality of open-source caption files may be received from the plurality of public databases. The first plurality of open-source caption files may be selected, by either the system or the user, based in part on the first event metadata. The first plurality of open-source caption files may be selected by various components of the system (e.g., a live caption feedback system 410, described in more detail with respect to FIGS. 4-5). For example, the first plurality of open-source caption files may be selected by identifying at least one song, performance, etc., that is likely to be played based on the event metadata. Once the system determines the at least one song or performance, the system may identify a first plurality of open-source caption files that match the identified song or performance. The number of open-source caption files comprising the first plurality may vary depending on the event metadata. For example, the event metadata may include a similarity score for related performances. Depending on the number of related performances having a similarity score above a predetermined threshold, the system may vary the number of open-source caption files that are download as part of the first plurality of open-source caption files.

In step 106, the system may preselect a first open-source caption file of the first plurality of open-source caption files. The preselection of the first open-source caption file may be based in part on the first event metadata. For example, the first event metadata may indicate that the first event is associated with a first adaptation of an opera performance. The system may receive the first plurality of open-source caption files that are associated with the opera performance, and preselect a first open-source caption file that is associated with the first adaptation of the opera performance. The first event metadata may include information related to the venue and the type of performance. For example, if a customer wishes to attend an opera rendition of "Romeo and Juliet" that is to be performed at the Metropolitan in New York City, the system (e.g. live caption feedback system 410) may first parse the title of the event to identity that the event is related to a version of "Romeo and Juliet." Additionally, based on the venue type being an opera house the system may determine that the appropriate rendition of Romeo and Juliet for which to gather a plurality of open-source caption files may be the opera version. Accordingly, the system may download a plurality of open-source caption files that are associated with the opera version of "Romeo and Juliet."

In step 108, the system may access an audiovisual recorder of the first user device. For example, the system may connect over a mobile or wireless network to the first user device and receive access to a video stream and/or an audio stream associated with the first event.

In step 110, the system (e.g., system 400, described in more detail with respect to FIGS. 4-5) may receive a live-streaming first feedback from the audiovisual recorder. A first feedback may be any portion of audio or video from the first event that the system may analyze and compare to the first plurality of open-source caption files. In some embodiments, the first feedback may be a live-feed continuous audio/video stream recorded by the first user device. The system may determine an open-source caption file that matches the first event based on the first feedback and the first metadata. The first metadata provides information related to which version, rendition, etc. of a live performance is being attended by the user. The first feedback provides the system with an audiovisual cue allowing the system to determine a synchronization between one of the first plurality of open-source caption files and the first feedback. For example, the first feedback may be identified with a change-point detection system integrated into system 400. In some embodiments, the first feedback is analyzed by a computer vision system integrated into system 400. In some embodiments, the system may be further configured to receive a feedback frequency (e.g., a frequency with which to receive feedback) from the first user device. The feedback frequency may be selected from an inclusive range between no feedback and continuous feedback. In some embodiments, the feedback frequency may be manually selected by the user depending on the user's preferences. For example, if the user is most interested in accuracy of the captioning, the user may select a continuous feedback frequency. If the user is more worried about conserving battery life and/or data connectivity, the user may manually select the feedback frequency to no feedback such that no mobile network connection is used by the system.

Figure 1B:
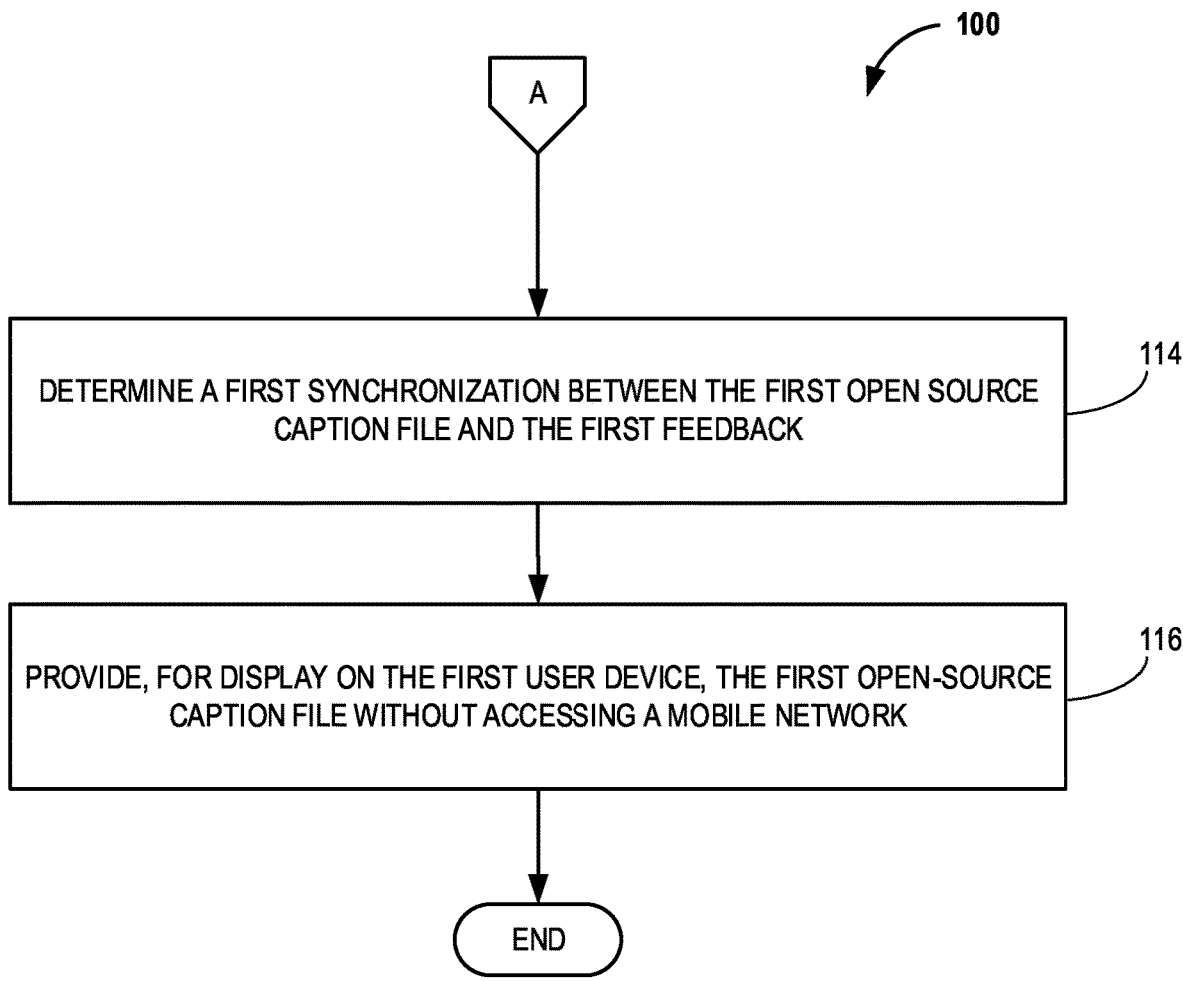

In decision block 112, the system may determine whether at least a portion of the first open source caption file matches the first feedback beyond a predetermined threshold. In some embodiments, the user may provide manual input indicative of whether at least a portion of the first open-source caption file matches the first feedback beyond the predetermined threshold. In other embodiments, the system may automatically make the determination. For example, the feedback may include a minimum audio segment length and a match may be determined when the respective open-source caption file matches text correlated with the respective audio segment. The match may be based on the open-source caption file matching the text beyond a predetermined threshold. When the system determines that at least a portion of the first open-source caption file matches the first feedback beyond a predetermined threshold, the method may move to step 114 as shown in FIG. 1B. When the system determines that at least the portion of the first open-source caption file does not match the first feedback beyond the predetermined threshold, the method may move to step 118 as shown in FIG. 1C.

As shown in FIG. 1B in step 114, responsive to determining that at least a portion of the first open-source caption file matches the first feedback beyond a predetermined threshold, the system (e.g., system 400, described in more detail with respect to FIGS. 4-5) may determine a first synchronization between the first open-source caption file and the first feedback. For example, the system may perform a form of speech to text analysis for the performance based on the first feedback. The system may receive a minimum audio segment length and convert the audio segment into text. The text may then be compared to the preselected open-source caption file. The portion of an open-source caption file that matches the first feedback may have a minimum matching sequence length. For example, the system may require a minimum sequence length for the first feedback to be determined to match the first open-source caption file in order to improve accuracy of the system and lower the incidence of false positive matches. In some embodiments, the first synchronization may be based in part on a processing time offset associated with a delay in processing a video sequence associated with the minimum audio segment length of the first feedback. For example, presentation of the first open-source caption file may be delayed with respect to the audio in order to better match the video stream portion of the first feedback. The delay may be based in part, for example, on identifying a lip synchronization between lyrics being sung at an event and the lyrics being presented in the first open-source caption file. In some embodiments, determining the first synchronization may include receiving, via the first user device (e.g., the first user device 430, described in more detail with respect to FIGS. 4-5), manual user feedback indicative of a preferred synchronization between a selected open-source caption file and the first feedback. Thus, in such instances, the user may manually select his/her own synchronization between the first feedback of the live event being attended and the first open-source caption file by selecting a portion of the caption file to be displayed in time with a portion of the live event. For example, the system may receive manual feedback indicative of a preferred synchronization between a selected open-source caption file and the first feedback, identify a second user device associated with a second user attending the first event, and provide the preferred synchronization to the second user device. Thus, the system is capable of providing a preferred synchronization to multiple user devices based on manual feedback received from just one user device. In some embodiments, the system may provide a preferred synchronization to multiple user devices based on automatically determining a preferred synchronization to the first user device, and automatically providing the preferred synchronization to the other user devices. In some embodiments, determining the first synchronization may include receiving the first feedback associated with the first event by a machine learning system. The machine learning system may improve caption synchronization with respect to a related event based on the first feedback. For example, the machine learning system may be able to improve how accurately the system is able to determine a synchronization between an open-source caption file and a related event, such as an original rock song and its popular cover version. The machine learning system may be further configured to analyze the received first feedback to recognize a singer's voice. Additionally, the machine learning system may classify the singer's voice by analyzing the first feedback to determine at least one unique audio signal portion associated with the singer's voice in order to identify the singer and the associated version of the song being performed. To accomplish this, the machine learning system may be configured to isolate an audio signal associated with a respective singer's voice from the first feedback, and analyze the isolated audio signal to determine at least one unique audio signal portion. Additionally, the machine learning system may integrate feedback received from a plurality of user devices attending the same event as the first user. Using feedback gathered from a plurality of user devices may improve the caption synchronization with respect to the first user device. In some embodiments, determining a similarity score for a related event may be based in part on the machine learning system determining the associated version of the song being performed based in part on the at least one unique audio signal portion associated with the respective singer's voice.

In step 116, the system may provide the first open-source caption file without accessing a mobile network for display on the first user device. Because the first open-source caption file has already been stored locally on the first user device, accessing a mobile network is not necessary in order to provide the first open-source caption file for display on the first user device. Further, storing the first plurality of open-source caption files may improve the functionality of the system by reducing inherent latency in providing caption files over a mobile network. When caption files are stored locally, latency associated with communication over a mobile network may be avoided. After step 116, the method may end.

Figure 1C:
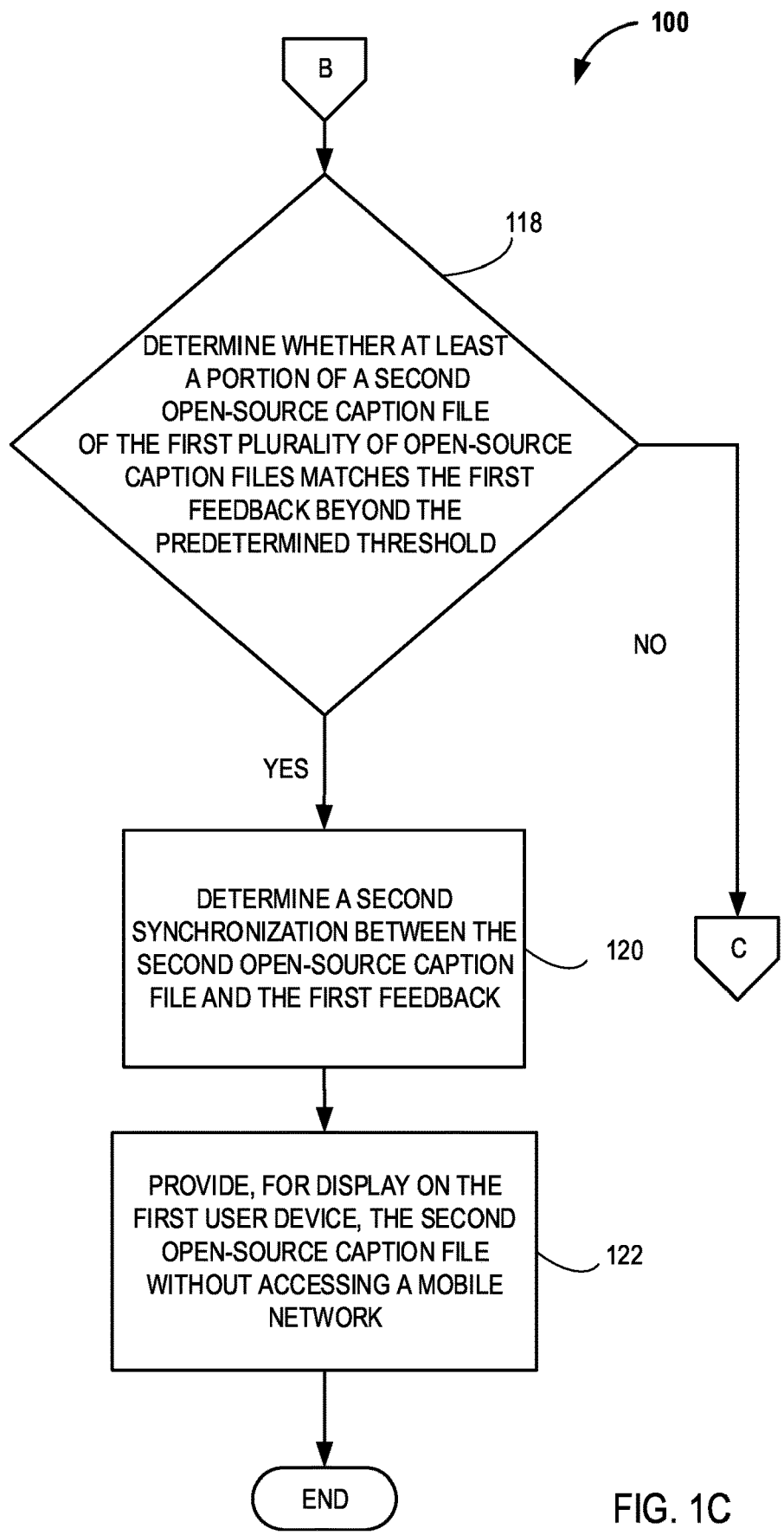

As shown in FIG. 1C in decision block 118, responsive to determining that at least a portion of the first open-source caption file does not match the first feedback beyond a predetermined threshold, the system may determine whether at least a portion of a second open-source caption file of the first plurality of open-source caption files matches the first feedback beyond the predetermined threshold. For example, the system may perform a form of speech to text analysis for the performance based on the first feedback. The system may receive a minimum audio segment length and convert the audio segment into text. The text may then be compared to the second open-source caption file. The portion of an open-source caption file that matches the first feedback may have a minimum matching sequence length. For example, the system may require a minimum sequence length for the first feedback to be determined to match the second open-source caption file in order to improve accuracy of the system and lower the incidence of false positive matches. The second open-source caption file may be one of the first plurality of open-source caption files stored locally on the first user device. For example, a first open-source caption file may be associated with Artist A's rendition of a popular rock song, which may have been preselected based on event metadata. However, after the system receives the first feedback, the system may determine that a second open-source caption file associated with Artist B's rendition of the same popular rock song is a better match (e.g., has a more accurate synchronization between the caption file and the first feedback) with the event based on the first feedback. Accordingly, the system may provide the second open-source caption file to the first device in place of the first open-source caption file. When at least a portion of a second open-source caption file of the first plurality of open-source caption files matches the first feedback beyond the predetermined threshold in decision block 118, the method may move to step 120. When at least a portion of a second open-source caption file does not match the first feedback beyond the predetermined threshold in decision block 118, the method may move to step 124 as shown in FIG. 1D.

In step 120, the system may determine a second synchronization between the second open-source caption file and the first feedback. In some embodiments, determining the second synchronization may include receiving, via the first user device (e.g., first user device 430, described in more detail with respect to FIGS. 4-5), manual user feedback indicative of a preferred synchronization between a selected open-source caption file and the first feedback. Thus, in some instances, the user may manually select his/her own synchronization between the second feedback of the live event being attended, and the first open-source caption file by selecting a portion of the caption file to be displayed in time with a portion of the live event. In some embodiments, the system may receive manual feedback indicative of a preferred synchronization between a selected open-source caption file and the first feedback, identify a second user device associated with a second user attending the first event, and provide the preferred synchronization to the second user device. Thus, the system is capable of providing a preferred synchronization to multiple user devices based on manual feedback received from just one user device. In some embodiments, the second synchronization is determined by the system for the first user device, and the second synchronization is automatically provided to the second user device. In some embodiments, the second synchronization may be determined by the system for the first user device, and the first user device may rate the quality of synchronization. If the quality score indicated by the first user is above a predetermined threshold, the system may provide the second synchronization to the second user device. In some embodiments, determining the first synchronization further includes receiving the first feedback associated with the first event by the machine learning system. The machine learning system may improve caption synchronization with respect to a related event based on the first feedback. For example, the machine learning system may be able to improve how accurately the system is able to determine a synchronization between an open-source caption file and a related event, such as an original rock song and its popular cover version. The machine learning system may additionally integrate feedback received from a plurality of user devices attending the same event as the first user. Using feedback gathered from a plurality of user devices may improve the caption synchronization with respect to the first user device. The machine learning system may additionally be configured to adjust one or more tuning parameters based on the event metadata. For example, the machine learning system may vary the required minimum sequence length based on certain parameters, such as the specific venue location, a venue category (e.g., opera house, stadium, club, etc.), etc. The machine learning system may iteratively vary the one or more tuning parameters based on integrated feedback received from a plurality of user devices attending the same event as a first user. Using feedback gathered from a plurality of user devices may improve accuracy with which the system determines a match between an open-source caption file and a received feedback by allowing the machine learning system to more accurately fine-tune the one or more tuning parameters. The system may provide, for display on the first user device, the second open-source caption file without accessing a mobile network in step 122. After step 122, the method may end.

Figure 1D:
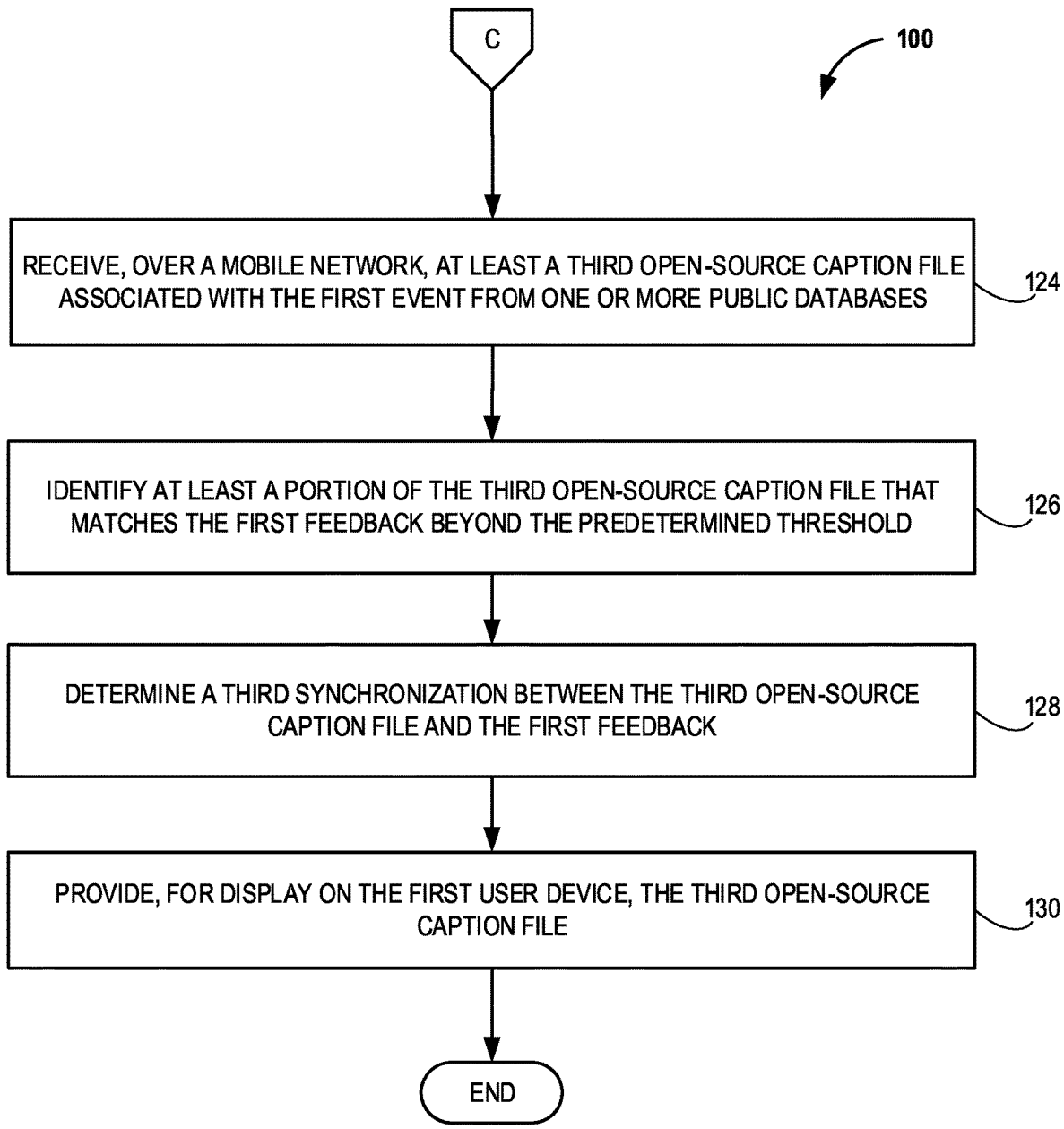

As shown in FIG. 1D, in step 124 the system may receive, over a mobile network, at least a third open-source caption file associated with the first event from one or more public databases. In some embodiments, the system receives at least the third open-source caption file over the mobile network only when neither the first synchronization nor the second synchronization matches the first feedback beyond the predetermined threshold. For example, when the system determines that both a first open-source caption file associated with Artist A's rendition of the rock song and a second caption file associated with Artist B's rendition of the same rock song do not match the first feedback beyond a predetermined threshold, the system (e.g. system 400, as described in more detail with respect to FIGS. 4-5) may receive at least a third open-source caption file associated with, for example, Artist C's rendition of the same rock song.

In step 126, the system may identify at least a portion of the third open-source caption file that matches the first feedback beyond the predetermined threshold. For example, the system may perform a form of speech to text analysis for the performance based on the first feedback. The system may receive a minimum audio segment length and convert the audio segment into text. The text may then be compared to the third open-source caption file. The portion of an open-source caption file that matches the first feedback may have a minimum matching sequence length. For example, the system may require a minimum sequence length for the first feedback to be determined to match the third open-source caption file in order to improve accuracy of the system and lower the incidence of false positive matches. In step 128, the system may determine a third synchronization between the third open-source caption file and the first feedback. In some embodiments, determining the third synchronization may include receiving, via the first user device (e.g., first user device 430, described in more detail with respect to FIGS. 4-5), manual user feedback indicative of a preferred synchronization between a selected open-source caption file and the first feedback. Thus, in some instances, the user may manually select his/her own synchronization between the first feedback of the live event being attended, and the third open-source caption file. In some embodiments, the system may receive manual feedback indicative of a preferred synchronization between a selected open-source caption file and the first feedback, identify a second user device associated with a second user attending the first event, and provide the preferred synchronization to the second user device. Thus, the system is capable of providing a preferred synchronization to multiple user devices based on manual feedback received from just one user device. In some embodiments, determining the first synchronization further includes receiving the first feedback associated with the first event by the machine learning system. The machine learning system may improve caption synchronization with respect to a related event based on the first feedback. For example, the machine learning system may be able to improve how accurately the system is able to determine a synchronization between an open-source caption file and a related event, such as an original rock song and its popular cover version. In step 130, the system may provide, for display on the first user device, the third open-source caption file. Referring to the last example, the first user device may receive an open-source caption file corresponding to Artist C's rock song rendition which has been synchronized to the live event based on determining a synchronization between the received caption file and the first feedback receive by the first user device. After step 130, the method may end.

Figure 2A:
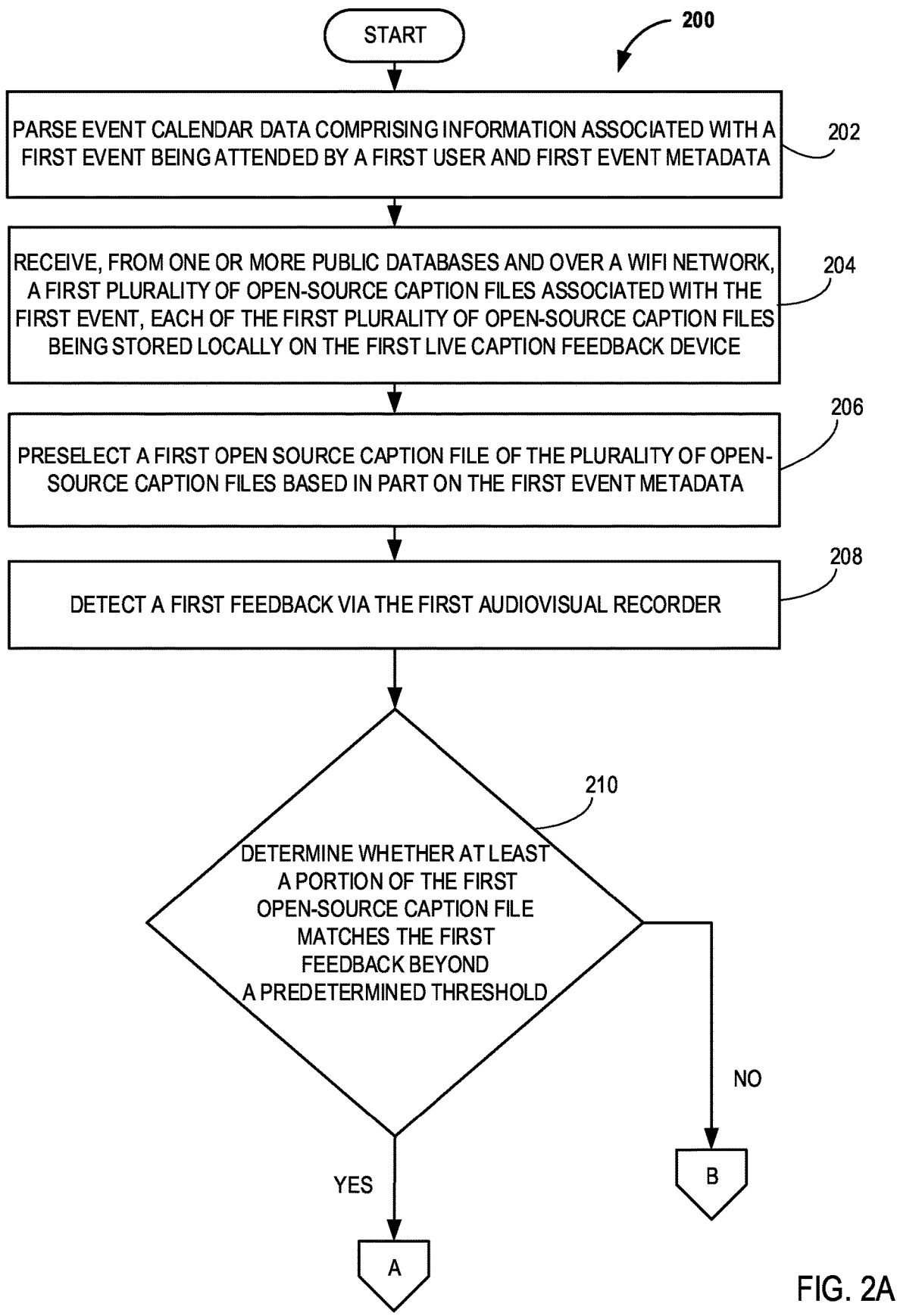
FIG. 2A-2D are flowcharts of a method for live captioning with a live caption feedback device, in accordance with some examples of the present disclosure.

FIGS. 2A-2D are flowcharts of a method for live captioning with a live caption feedback device, in accordance with some examples of the present disclosure. Method 200 includes some steps similar to or overlapping with those of method 100. The full description of such steps will be omitted for brevity, and instead reference will be made back to their respective descriptions as part of method 100. Although steps in method 200 are described as being performed by a device (e.g., the first user device 430 of the system 400, described in more detail with respect to FIGS. 4-5), a person of ordinary skill in the art will understand that some or all of the steps of method 200 may be performed by one or more devices of the system (e.g., the system 400, as described in more detail with respect to FIGS. 4-5). As shown in FIG. 2A, in step 202 of method 200, the device (e.g., the first user device 430, described in more detail with respect to FIGS. 4-5) may parse event calendar data. The event calendar may already be stored locally on the device or the device may receive event calendar data from one of a plurality of financial service providers that may have recorded transaction data for the user in which the user has purchased tickets for events that may require a live caption feedback system, as described herein. In some embodiments, location data received from the first device may provide the system with event calendar data. For example, when the system receives a GPS location from the first user device for, e.g., the Richard Rodgers Theater in New York, the system may determine, based on an event calendar associated with the Richard Rodgers Theater, that the first user may be attending the Broadway show, "Hamilton." The event calendar data may include information associated with a first event being attended by a first user and a first event metadata. For example, the event calendar data may include information indicating that a user has purchased tickets for a particular live performance. The first event metadata may include information for an event related to the first event. For example, Director A may have a particular adaptation of Play A which may omit some dialogue found in Director B's adaptation of Play A. Director A's adaptation of Play A may include event metadata that provides a similarity score between Director A's and Director B's version of Play A, so that the system (e.g., system 400, described in more detail with respect to FIGS. 4-5) is able to preselect the most advantageous open-source caption file of the plurality of caption files to provide to the user. The similarity score may be determined by matching one or more tuning parameters associated with the event (e.g., venue size, specific venue identification, venue type identification, audience size, etc.) The system may also utilize feedback gathered from a plurality of user devices to improve accuracy with which the system determines a similarity score between two potentially related events. The event metadata may also include a similarity score indicative of the predetermined similarity between any given event and an open-source caption file available to the system via the plurality of public databases. The similarity score may be a decimal value between 0 and 1, with a value of 1 representing an exact match, and a value of 0 representing no similarity whatsoever.

Figure 4:
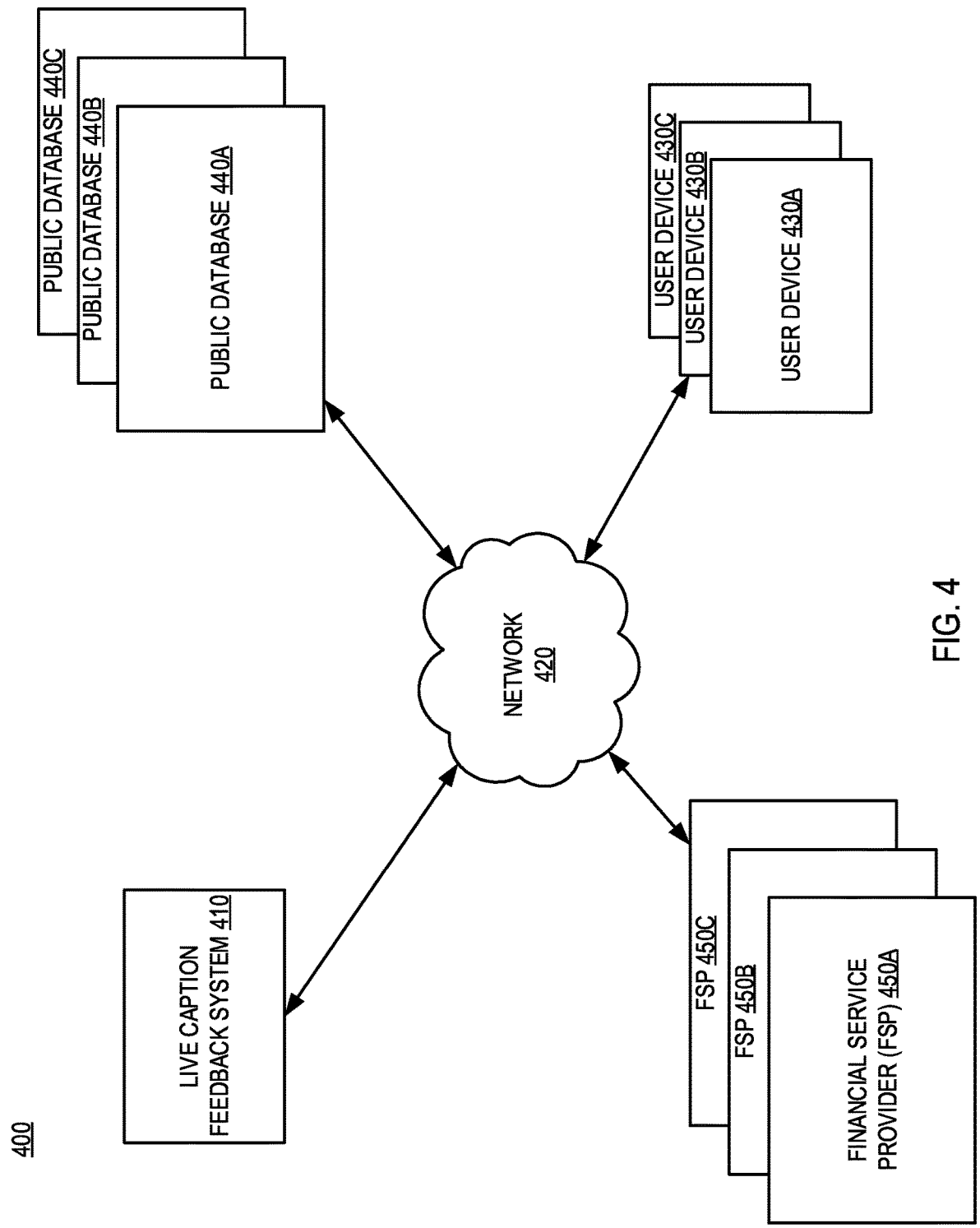
FIG. 4 illustrates an exemplary live caption feedback system consistent with disclosed embodiments.
Figure 5:
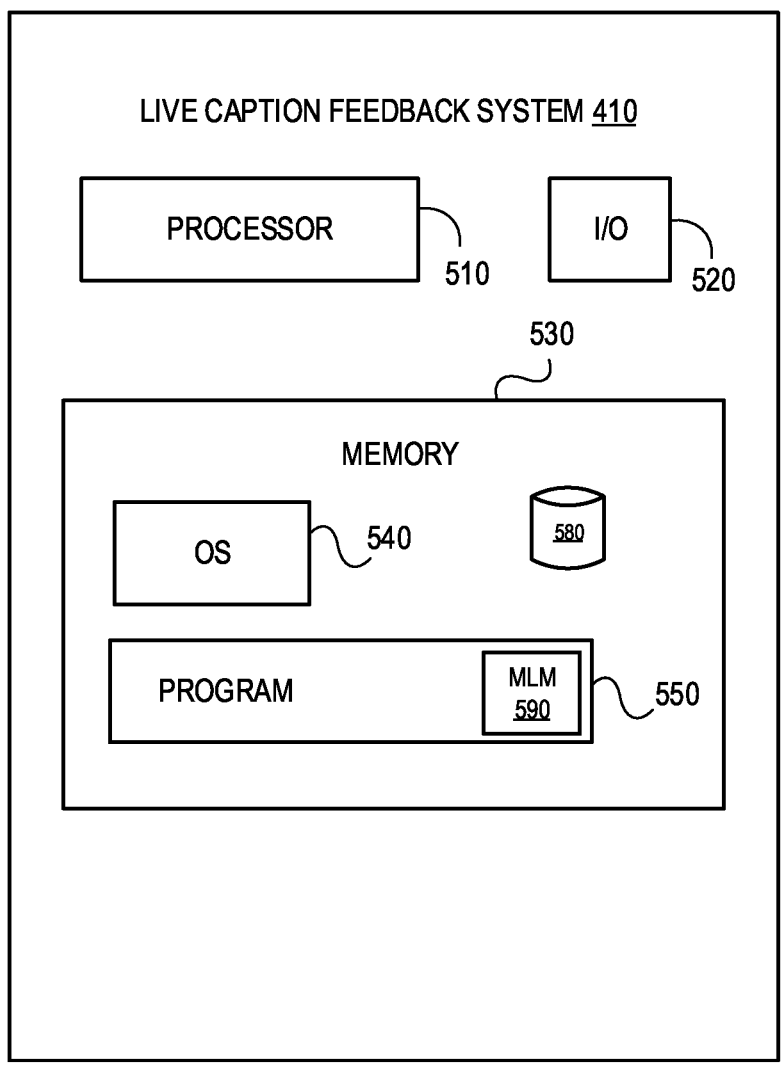
FIG. 5 is a component diagram of an exemplary live caption feedback device and/or system.

In step 204, the device (e.g., the first user device 430, described in more detail with respect to FIGS. 4-5) may receive a first plurality of open-source caption files associated with the first event. Step 204 of method 200 is similar to step 104 of method 100, and so a full description of step 204 is omitted here for brevity.

In step 206, the device (e.g., the first user device 430, as described in more detail with respect to FIGS. 4-5) may preselect a first open-source caption file of the first plurality of open-source caption files. Step 206 of method 200 is similar to step 106 of method 100, and so a full description of step 206 is omitted here for brevity.

In step 208, the device may detect a first feedback, the first feedback including an audiovisual signal detected by the first user device. The first user device may include various I/O components, including an audiovisual recorder, as described in more detail with respect to FIGS. 4-5, that may be configured to detect the first feedback. In some embodiments, the first feedback may be detected automatically by the device. In other embodiments, the first feedback is detected in response to a user input to the first user device giving the device instructions to activate the audiovisual recorder of the device. In some embodiments, the system (e.g., system 400, described in more detail with respect to FIGS. 4-5) may be further configured to receive, from a first user device, a feedback frequency. The feedback frequency may be selected from an inclusive range between no feedback and continuous feedback.

Figure 2B:
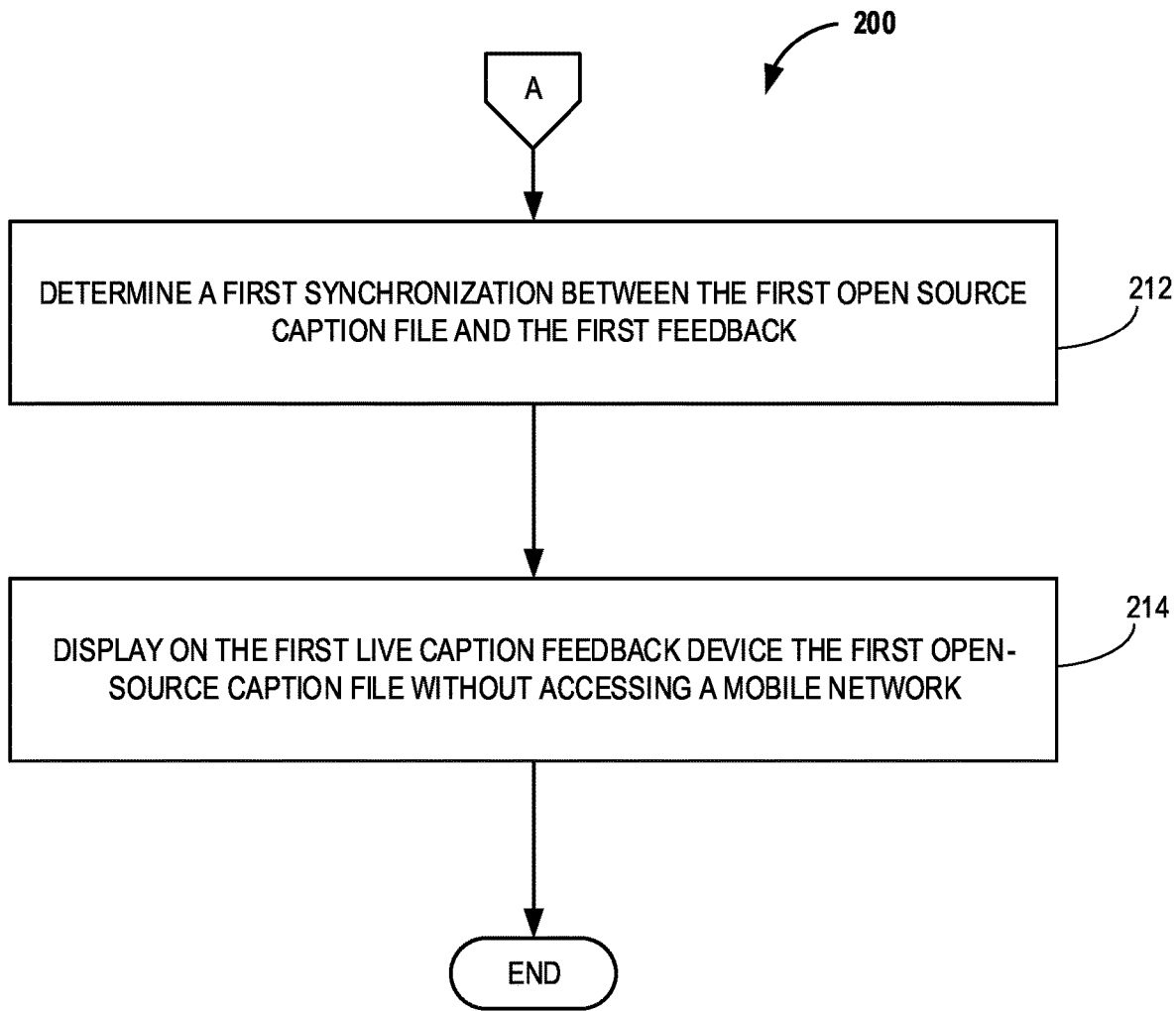

In decision block 210, the device may determine whether at least a portion of the first open-source caption file matches the first feedback beyond a predetermined threshold. For example, the system may perform a form of speech to text analysis for the performance based on the first feedback. The system may receive a minimum audio segment length and convert the audio segment into text. The text may then be compared to the second open-source caption file. The portion of an open-source caption file that matches the first feedback may have a minimum matching sequence length. For example, the system may require a minimum sequence length for the first feedback to be determined to match the first open-source caption file in order to improve accuracy of the system and lower the incidence of false positive matches. In some aspects of the disclosure the system (e.g., system 400, described in more detail with respect to FIGS. 4-5) performs the determination step, as in method 100. In other embodiments, the determination of whether the first open-source caption file matches the first feedback beyond the predetermined threshold may be determined by the device (e.g., the first user device 430, described in more detail with respect to FIGS. 4-5). Decision block 210 is similar to decision block 112 of method 100, and so a full description of decision block 210 is omitted here for brevity. When at least a portion of the first open-source caption file matches the first feedback beyond the predetermined threshold in decision block 210, method 200 may move to step 212, as shown in FIG. 2B. When at least a portion of the first open-source caption file does not match the first feedback beyond the predetermined threshold in decision block 210, method 200 may move to step 216, as shown in FIG. 2C.

In step 212, the device may determine a first synchronization between the first open-source caption file and the first feedback. Step 212 of method 200 is similar to step 114 of method 100, and so a full description of step 212 is omitted here for brevity. In some embodiments, determining the first synchronization may include receiving, via the first user device (e.g., the first user device 430, described in more detail with respect to FIGS. 4-5), manual user feedback indicative of a preferred synchronization between a selected open-source caption file and the first feedback. Thus, in some instances, the user may simply select his/her own synchronization between the second feedback of the live event being attended, and the first open-source caption file. In some embodiments, the system may receive manual feedback indicative of a preferred synchronization between a selected open-source caption file and the first feedback, identify a second user device associated with a second user attending the first event, and provide the preferred synchronization to the second user device. Thus, the system is capable of providing a preferred synchronization to multiple user devices based on manual feedback received from just one user device. In some embodiments, determining the first synchronization further includes receiving the first feedback associated with the first event by a machine learning system. The machine learning system may improve caption synchronization with respect to a related event based on the first feedback. For example, the machine learning system may be able to improve how accurately the system is able to determine a synchronization between an open-source caption file and a related event, such as an original rock song and its popular cover version.

In step 214, the device may display the first open-source caption file without accessing a mobile network. No access to a mobile network is necessary because the device is configured to download and store the first plurality of open-source caption files from one or more public databases in response to parsing event metadata associated with events that the user is planning on attending. Thus, the first plurality of open-source caption files may be downloaded over a wireless network and stored locally prior to the user attending the event. Once a first synchronization is determined between the first open-source caption file and the first feedback (as described in more detail with respect to step 114 of method 100), the device may display the synchronized first open-source caption file without accessing mobile network, saving valuable bandwidth and improving network congestion endemic to large concerts and other similar events for which live captioning may be requested. Following step 214, method 200 may end. In some embodiments, after displaying the synchronized first open-source caption file without accessing a mobile network, the system may continuously monitor the captioning process to ensure that the captions remain synchronized to the first feedback. In other embodiments, the system may not continuously monitor the captioning process to ensure the captions remained synchronized, depending on the preferences of the user (e.g., does the user want to conserve battery and have potentially less accurate synchronization, or does the user wish to sacrifice battery life and data usage for greater accuracy in synchronization).

Figure 2C:
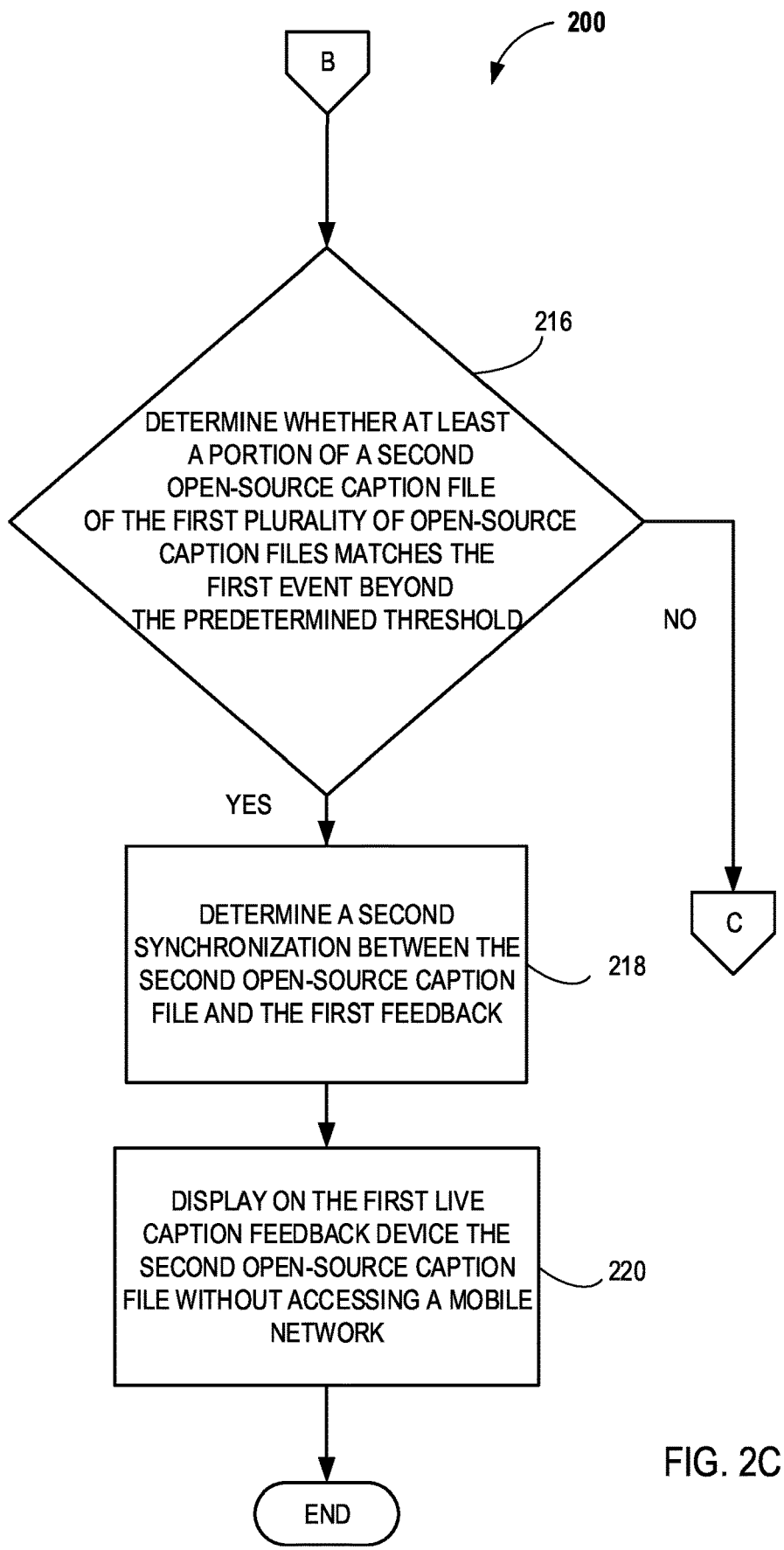

When at least a portion of the first open-source caption file does not match the first feedback beyond the predetermined threshold in decision block 210, method 200 may move to decision block 216, as shown in FIG. 2C. In decision block 216, the device may determine whether at least a portion of a second open-source caption file of the first plurality of open-source caption files matches the first event beyond the predetermined threshold. The number of open-source caption files comprising the first plurality may vary depending on the event metadata. For example, the event metadata may include a similarity score for related performances. Additionally, the second open-source caption file of the first plurality of open-source caption files may chosen based on which open-source caption file has a highest similarity score to the first open-source caption file. Decision block 216 of method 200 is similar to decision block 118 of method 100, and so a full description of decision block 216 is omitted here for brevity. When the device determines that at least a portion of the second open-source caption file of the first plurality of open-source caption files matches the first event beyond the predetermined threshold, the method may move to step 218. When the device determines that at least a portion of the second open-source caption file of the first open-source caption files does not match the first event beyond the predetermined threshold, the method may move to step 222, as shown in FIG. 2D.

In step 218, the device may determine a second synchronization between the second open-source caption file and the first feedback. In some embodiments, determining the second synchronization may include receiving, via the first user device (e.g., the first user device 430, described in more detail with respect to FIGS. 4-5), manual user feedback indicative of a preferred synchronization between a selected open-source caption file and the first feedback. Thus, in some instances, the user may simply select his/her own synchronization between the second feedback of the live event being attended, and the first open-source caption file. In some embodiments, the system may receive manual feedback indicative of a preferred synchronization between a selected open-source caption file and the first feedback, identify a second user device associated with a second user attending the first event, and provide the preferred synchronization to the second user device. Thus, the system is capable of providing a preferred synchronization to multiple user devices based on manual feedback received from just one user device. In some embodiments, determining the first synchronization further includes receiving the first feedback associated with the first event by a machine learning system. The machine learning system may improve caption synchronization with respect to a related event based on the first feedback. For example, the machine learning system may be able to improve how accurately the system is able to determine a synchronization between an open-source caption file and a related event, such as an original rock song and its popular cover version. The device may display the second open-source caption file without accessing a mobile network in step 220. After step 220, method 200 may end.

Figure 2D:
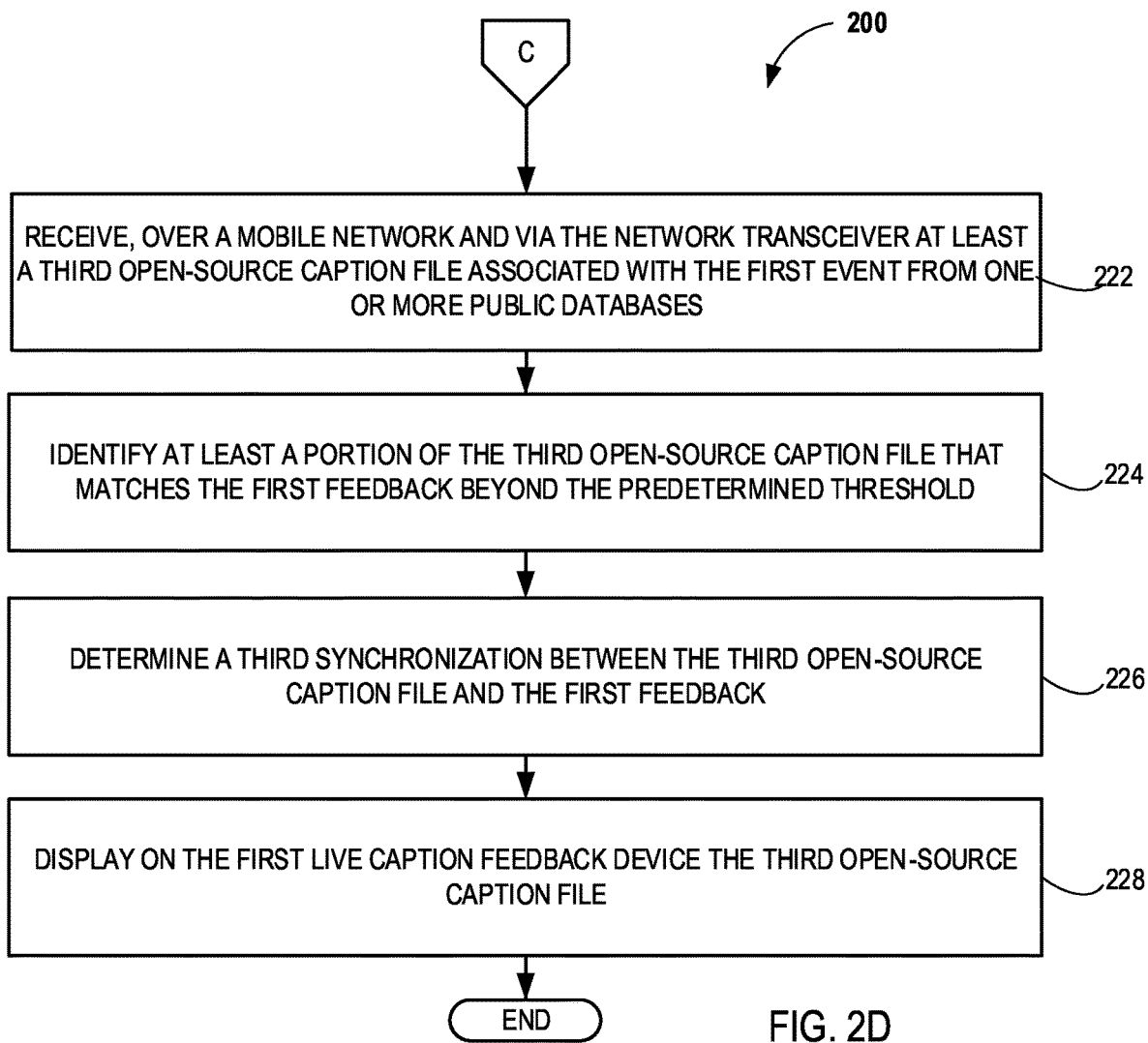

When the device determines that at least a portion of the second open-source caption file of the first open-source caption files does not match the first event beyond the predetermined threshold, the method may move to step 222, as shown in FIG. 2D. In step 222, the device may receive at least a third open-source caption file associated with the first event from one or more public databases over a mobile network. In some embodiments, the system receives at least the third open-source caption file over the mobile network only when neither the first synchronization nor the second synchronization matches the first feedback beyond the predetermined threshold. For example, returning to the example from step 124 of method 100, when the device determines that both a caption file associated with Artist A's rendition of a rock song and a caption file associated with Artist B's rendition of the same rock song do not the first feedback beyond the predetermined threshold, the device may receive at least a third open-source caption file associated with, e.g., Artist C's rendition of the same rock song.

In step 224, the device (e.g., the first user device 430, as described in more detail with respect to FIGS. 4-5) may identify at least a portion of the third open-source caption file that matches the first feedback beyond the predetermined threshold. Step 224 of method 200 is similar to step 126 of method 100, and so a full description of step 224 is omitted here for brevity. In step 226, the device may determine a third synchronization between the third open-source caption file and the first feedback. The determination of a third synchronization happens in a similar manner as described with respect to determining a second synchronization in step 218 and determining a first synchronization, as described in step 212. In some embodiments, determining the second synchronization may include receiving, via the first user device, manual user feedback indicative of a preferred synchronization between a selected open-source caption file and the first feedback. Thus, in some instances, the user may simply select his/her own synchronization between the second feedback of the live event being attended, and the first open-source caption file. In some embodiments, the system may receive manual feedback indicative of a preferred synchronization between a selected open-source caption file and the first feedback, identify a second user device associated with a second user attending the first event, and provide the preferred synchronization to the second user device. Thus, the system is capable of providing a preferred synchronization to multiple user devices based on manual feedback received from just one user device. In some embodiments, determining the first synchronization further includes receiving the first feedback associated with the first event by a machine learning system. The machine learning system may improve caption synchronization with respect to a related event based on the first feedback. For example, the machine learning system may be able to improve how accurately the system is able to determine a synchronization between an open-source caption file and a related event, such as an original rock song and its popular cover version. Once a third synchronization has been determined in step 226, the device displays the third open-source caption file on step 228. Following step 228, method 200 may end.

Figure 3A:
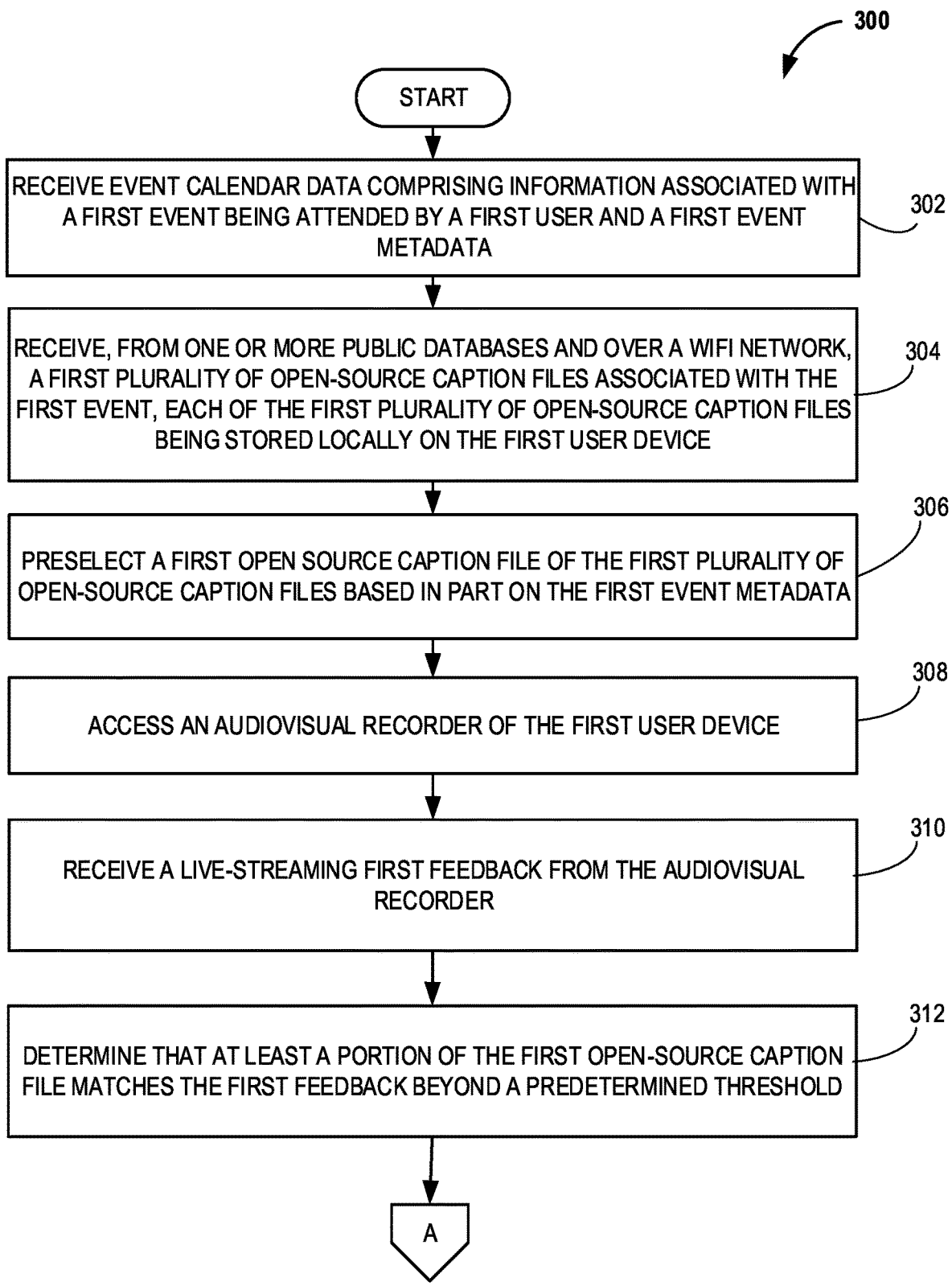
FIG. 3A-3B are flowcharts of a method for resynchronizing a caption with a live-stream after detecting an interruption in the live-stream, in accordance with some examples of the present disclosure.
Figure 3B:
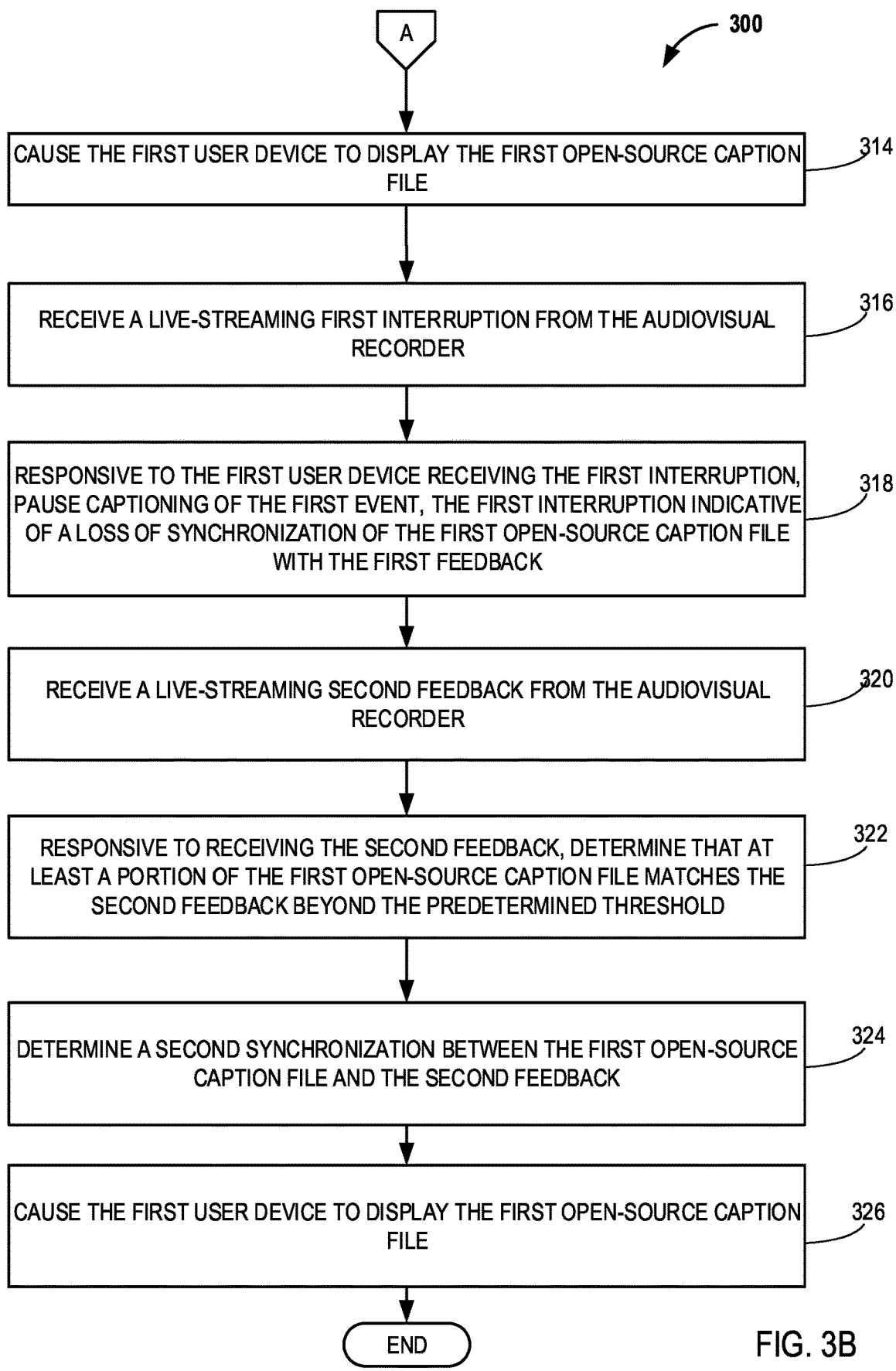

FIGS. 3A-3B are flowcharts of a method for resynchronizing a caption with a live-stream after detecting an interruption in the live-stream. Although steps in method 300 are described as being performed by the system (e.g., system 400 as described in more detail with respect to FIGS. 4-5), a person of ordinary skill in the art will understand that some or all of the steps of method 100 may be performed by the device (e.g., the first user device 430, as described in more detail with respect to FIGS. 4-5). Method 300 includes some steps similar to that of method 100. The full description of such steps will be omitted for brevity, and instead reference will be made back to their respective descriptions as part of method 100. In step 302, as shown in FIG. 3A, the system may receive event calendar data. The event calendar data may comprise information associated with a first event being attended by a first user and a first event metadata. For example, the event calendar data may include information indicating that a user has purchased tickets for a particular live performance. The first event metadata may include information for an event related to the first event. For example, Director A may have a particular adaptation of Play A which may omit some dialogue found in Director B's adaptation of Play A. Director A's adaptation of Play A may include event metadata that provides a similarity score between Director A's and Director B's version of Play A, so that the system is able to preselect the most advantageous open-source caption file of the plurality of caption files to provide to the user. The similarity score may be determined by matching one or more tuning parameters associated with the event (e.g., venue size, specific venue identification, venue type identification, audience size, etc.) The system may also utilize feedback gathered from a plurality of user devices to improve accuracy with which the system determines a similarity score between two potentially related events. The event metadata may also include a similarity score indicative of the predetermined similarity between any given event and an open-source caption file available to the system via the plurality of public databases.

In step 304, the system (e.g., system 400, described in more detail with respect to FIGS. 4-5) may receive, from one or more public databases and over a wireless network, a first plurality of open-source caption files associated with the first event. Each of the first plurality of open-source caption files may be stored locally on the first user device. Step 304 of method 3400 is similar to step 104 of method 100, and so a full description of step 304 is omitted here for brevity.

In step 306, the system may preselect a first open-source caption file of the first plurality of open-source caption files based in part on the first event metadata. Step 306 of method 300 is similar to step 106 of method 100, and so a full description of step 306 is omitted here for brevity.

In step 308, the system may access an audiovisual recorder of the first user device. For example, the system may connect over a mobile network to the first user device and receive access to a video stream and/or an audio stream associated with the first event.

In step 310, the system (e.g., system 400, described in more detail with respect to FIGS. 4-5), may receive a live-streaming first feedback from the audiovisual recorder. A first feedback may be any portion of audio or video from the first event that the system may analyze and compare to the first plurality of open-source caption files. The system may determine an open-source caption file that matches the first event based on the first feedback and the first metadata. The first metadata provides information related to which version, rendition, etc. of a live performance is being attended by the user. The first feedback provides the system with an audiovisual cue allowing the system to determine a synchronization between one of the first plurality of open-source caption files and the first feedback. In some embodiments, the system (e.g., system 400, described in more detail with respect to FIGS. 4-5) may be further configured to receive, from the first user device, a feedback frequency. The feedback frequency may be selected from an inclusive range between no feedback and continuous feedback.

In step 312, the system may determine that at least a portion of the first open-source caption file matches the first feedback beyond a predetermined threshold. For example, the system may perform a form of speech to text analysis for the performance based on the first feedback. The system may receive a minimum audio segment length and convert the audio segment into text. The text may then be compared to the second open-source caption file. The portion of an open-source caption file that matches the first feedback may have a minimum matching sequence length. For example, the system may require a minimum sequence length for the first feedback to be determined to match the first open-source caption file in order to improve accuracy of the system and lower the incidence of false positive matches. In response to determining that at least the portion of the first open-source caption file matches the first feedback beyond the predetermined threshold, the method may move to step 314, as shown in FIG. 3B. In step 314, the system may cause the first user device to display the first open-source caption file.

In step 316, the system (e.g., system 400, described in more detail with respect to FIGS. 4-5) may receive a live-streaming first interruption from the audiovisual recorder. For example, the system may respond to the user leaving the venue and pause captioning to the first user device. In another example, the system may respond to an unexpected intermission in a play by pausing live-captioning to the first user device.

In step 318, in response to the first user device receiving the first interruption, the system may pause captioning of the first event. The first interruption may be indicative of a loss of synchronization of the first open-source caption file with the first feedback.

In step 320, the system may receive (e.g., via the first user device 430, described in more detail with respect to FIGS. 4-5) a second feedback from the audiovisual recorder. The second feedback may be indicative of an establishment of synchronization of the first open-source caption file with the second feedback. In step 322, in response to receiving the second feedback, the system may determine that at least a portion of the first open-source caption file matches the second feedback beyond the predetermined threshold. In step 324, the system may determine a second synchronization between the first open-source caption file and the second feedback. Finally, in step 326, the system may cause the first user device to display the first open-source caption file.

FIG. 4 illustrates an exemplary live caption feedback system consistent with disclosed embodiments. The example system environment of FIG. 4 may be used to implement one or more embodiments of the present disclosure. The components and arrangements shown in FIG. 4 are not intended to limit the disclosed embodiments as the components used to implement the disclosed processes and features may vary.

In accordance with the disclosed embodiments, system 400 may include a live caption feedback system 410 in communication with one or more user devices 430A, 430B, 430C, etc. (collectively user devices 430). The live caption feedback system 410 may use network 420 to communicate with the various other components of system 400. In some embodiments, live caption feedback system 410 may also be in communication with various databases. For example, live caption feedback system 410 may be in communication with one or more public databases 440A, 440B, 440C, etc. (collectively referred to as public databases 430). The one or more public databases may store a plurality of open-source caption files that the system (e.g., via live caption feedback system 410 and/or user device(s) 430) may download for storage. Live caption feedback system 410 may also be in communication with one or more financial service provider databases 450A, 450B, 450C, etc. (collectively referred to as financial service providers 450). The financial service providers 450 may have event calendar data available for the system to access. The event calendar data may be based in part on financial transactions associated with the user stored on each respective financial service provider 450A, 450B, 450C, etc. User device(s) 430 may be mobile computing devices (e.g., smart phones, tablet computers, smart wearable devices, portable laptop computers, voice command device, wearable augmented reality device, or other mobile computing device).

Network 420 may be of any suitable type, including individual connections via the internet such as cellular or WiFi networks. In some embodiments, network 105 may connect terminals using direct connections such as radio-frequency identification (RFID), near-field communication (NFC), Bluetooth™, low-energy Bluetooth™ (BLE), WiFi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

An example embodiment of live caption feedback system 410 is shown in more detail in FIG. 5. User device(s) 430 may have a similar structure and components that are similar to those described with respect to service provider system

410. As shown, live caption feedback system 410 may include a processor 510, an input/output ("I/O") device 520, a memory 530 containing an operating system ("OS") 540, a program 550, and a database 580. The program may additionally include a machine learning model 590. For example, live caption feedback system 410 may be a single server or may be configured as a distributed computer system including multiple servers or computers that interoperate to perform one or more of the processes and functionalities associated with the disclosed embodiments. In some embodiments, live caption feedback system 410 may further include a peripheral interface, a transceiver, a mobile network interface in communication with processor 510, a bus configured to facilitate communication between the various components of the live caption feedback system 410, and a power source configured to power one or more components of live caption feedback system 410.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig-Bee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 410 to communicate with other devices via wired or wireless networks, whether local or wide area, private or public, as known in the art. A power source may be configured to provide an appropriate alternating current (AC) or direct current (DC) to power components.

As described above, live caption feedback system 410 may configured to remotely communicate with one or more other devices, such as user device(s) 430. According to some embodiments, live caption feedback system 110 may utilize a trained machine learning model 590 to improve caption synchronization with respect to an event related to the one being attended by the user of system 400.

Processor 510 may include one or more of a microprocessor, microcontroller, digital signal processor, co-processor or the like or combinations thereof capable of executing stored instructions and operating upon stored data. Memory 530 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 530.

Processor 510 may be one or more known processing devices, such as a microprocessor from the Pentium™ family manufactured by Intel™ or the Turion™ family manufactured by AMD™. Processor 510 may constitute a single core or multiple core processor that executes parallel processes simultaneously. For example, processor 510 may be a single core processor that is configured with virtual processing technologies. In certain embodiments, processor 510 may use logical processors to simultaneously execute and control multiple processes. Processor 510 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Live caption feedback system 410 may include one or more storage devices configured to store information used by processor 510 (or other components) to perform certain functions related to the disclosed embodiments. In one example, live caption feedback system 410 may include memory 530 that includes instructions to enable processor 510 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, live caption feedback system 410 may include memory 530 that includes instructions that, when executed by processor 510, perform one or more processes consistent with the functionalities disclosed herein. Methods, systems, and articles of manufacture consistent with disclosed embodiments are not limited to separate programs or computers configured to perform dedicated tasks. For example, live caption feedback system 410 may include memory 530 that may include one or more programs 550 to perform one or more functions of the disclosed embodiments. Moreover, processor 510 may execute one or more programs 550 located remotely from live caption feedback system 410. For example, live caption feedback system 410 may access one or more remote programs 550, that, when executed, perform functions related to disclosed embodiments.

Memory 530 may include one or more memory devices that store data and instructions used to perform one or more features of the disclosed embodiments. Memory 530 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 530 may include software components that, when executed by processor 510, perform one or more processes consistent with the disclosed embodiments. In some embodiments, memory 530 may include an internal database 580 for storing a plurality of open-source caption files to enable live caption feedback system 410 to perform one or more of the processes and functionalities associated with the disclosed embodiments.

Live caption feedback system 410 may also be communicatively connected to one or more memory devices (e.g., databases (not shown)) locally or through a network. The remote memory devices may be configured to store information and may be accessed and/or managed by live caption feedback system 410. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Live caption feedback system 410 may also include one or more I/O devices 520 that may include one or more interfaces for receiving signals or input from devices and providing signals or output to one or more devices that allow data to be received and/or transmitted by live caption feedback system 410. For example, live caption feedback system 410 may include interface components, which may provide interfaces to one or more input devices, such as one or more keyboards, mouse devices, touch screens, track pads, trackballs, scroll wheels, digital cameras, microphones, sensors, and the like, that enable live caption feedback system 410 to receive data from one or more users (e.g., user device(s) 430). Additionally, I/O 520 may include the audiovisual recorder utilized for receiving a feedback based on the event attended by the user.

In example embodiments of the disclosed technology, live caption feedback system 410 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While live caption feedback system 410 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of live caption feedback system 410 may include a greater or lesser number of components than those illustrated.

Examples of the present disclosure relate to systems and methods for captioning a live performance in real-time. In one aspect, a live caption feedback system is disclosed. The system may receive, from a first user device, event calendar data. The event calendar data may include information associated with a first event being attended by a first user and first event metadata. The system may receive, from one or more public databases and over a wireless network, a first plurality of open-source caption files associated with the first event. Each of the plurality of open-source caption files may be stored locally on the first user device. The system may preselect a first open-source caption file of the first plurality of caption files based in part on the first event metadata. The system may access an audiovisual recorder of the first user device and receive a live-streaming first feedback from the audiovisual recorder. In response to receiving the first feedback, the system may determine whether at least a portion of the first open-source caption files matches the first feedback beyond a predetermined threshold. When at least the portion of the first open-source caption file does not match the first feedback beyond the predetermined threshold, the system may determine whether at least a portion of a second open-source caption file of the first plurality of open-source caption files matches the first feedback beyond the predetermined threshold and responsive to the determination may (i) determine a second synchronization between the second open-source caption file and the first feedback and (ii) provide, for display on the first user device, the second open-source caption file without access a mobile network. In response to determining that at least the portion of the second open-source caption file does not match the first feedback beyond the predetermined threshold, the system may (i) receive, over a mobile network, at least a third open-source caption file associated with the first event from one or more public databases, (ii) identify at least a portion of the third open-source caption file that matches the first feedback beyond the predetermined threshold, (iii) determine a third synchronization between the third open-source caption file and the first feedback, and (iv) provide, for display on the first user device, the third open-source caption file.

In some embodiments, determining one or more synchronizations of the first, second, and third synchronizations may further include receiving, via the first user device, manual user feedback indicative of a preferred synchronization between a selected open-source caption file and the first feedback.

In some embodiments, the system may be further configured to receive, via the first user device, manual feedback indicative of a preferred synchronization between a selected open-source caption file and the first feedback, identify a second user device associated with a second user attending the first event, and provide the preferred synchronization to the second user device.

In some embodiments, the system may be further configured to receive, from the first user device, a feedback frequency. The feedback frequency may be selected from a range between no feedback and continuous feedback.

In some embodiments, the system may be further configured to cause the first user device to receive at least the third open-source caption files over the mobile network only when neither the first synchronization nor the second synchronization match the first feedback beyond the predetermined threshold.

In some embodiments, the first event metadata may include a similarity score indicative of a predetermined similarity to each one of the first plurality of open-source caption files.

In some embodiments, determining one or more synchronizations of the first, second, and third synchronization further includes receiving the first feedback associated with the first event by a machine learning system and improving the caption synchronization with the machine learning system with respect to a related event based on the first feedback.

In another aspect, a first live caption feedback device is disclosed. The first live caption feedback device may include a first audiovisual recorder, a network transceiver, one or more processors, and memory in communication with the processors, and storing instructions that, when executed by the one or more processors, are configured to cause the first live caption feedback device to perform the steps described herein. The first live caption feedback device may parse event calendar data including information associated with a first user being attended by a first user and first event metadata. The first live caption feedback device may receive, from one or more public databases and over a wireless network, a first plurality of open-source caption associated with the first event. Each of the first plurality of open-source caption files may be stored locally on the first live caption feedback device. The device may preselect a first open-source caption file of the plurality of open-source caption files based in part on the first event metadata. The device may detect a live-streaming first feedback with the first audiovisual recorder. In response to detecting the first feedback, the device may determine whether at least a portion the first open-source caption file matches the first feedback beyond a predetermined threshold. When at least the portion of the first open-source caption file matches the first feedback beyond the predetermined threshold, the device may (i) determine a first synchronization between the first open-source caption file and the first feedback and (ii) display on the first live caption feedback device the first open-source caption file without accessing a mobile network. When at least the portion of the first open-source caption file does not match the first feedback beyond the predetermined threshold, the system may determine whether at least a portion of a second open-source caption file of the first plurality of open-source caption files matches the first feedback beyond the predetermined threshold. In response to determining that at least the portion of the second open-source caption files matches the first feedback beyond the predetermined threshold, the device may (i) determine a second synchronization between the second open-source caption file and the first feedback, (ii) display on the first live caption feedback device the second open-source caption file without accessing a mobile network. In response to determining that at least the portion of the second open-source caption file does not match the first feedback beyond the predetermined threshold, the first live caption feedback device may (i) receive, over a mobile network and via the network transceiver, at least a third open-source caption file associated with the first event form one or more public databases, (ii) identify at least a portion of the third open-source caption file that matches the first feedback beyond the predetermined threshold, (iii) determine a third synchronization between the third open-source caption file and the first feedback, and (iv) display on the first live caption feedback device the third open-source caption file.

In some embodiments, determining one or more synchronizations of the first, second, and third synchronizations further includes receiving manual user feedback indicative of a preferred synchronization between a selected open-source caption file and the first feedback.

In some embodiments, the device is further configured to receive, by the first live caption feedback device, manual feedback indicative of a preferred synchronization between a selected open-source caption file and the first feedback, identify a second live caption feedback device associated with a second user attending the first event, and provide the preferred synchronization to the second live caption feedback device.

In some embodiments, the device is further configured to transmit a feedback frequency, wherein the feedback frequency may be selected from a range between no feedback and continuous feedback.

In some embodiments, the live caption feedback device may receive at least the third open-source caption file over the mobile network only when neither the first synchronization nor the second synchronization match the first feedback beyond the predetermined threshold.

In some embodiments, the first event metadata may include a similarity score indicative of a predetermined similarity to each one of the first plurality of open-source caption files.

In some embodiments, determining one or more synchronizations of the first, second, and third synchronization may further include receiving the first feedback associated with the first event by a machine learning system and improving caption synchronization, via the machine learning system, with respect to a related event based on the first feedback.

In yet another aspect, a live caption feedback system is disclosed. The system may receive, from a first user device, event calendar data. The event calendar data may include information associated with a first event being attended by a first user and first event metadata. The system may receive, from one or more public databases and over a wireless network, a first plurality of open-source caption files associated with the first event. Each of the first plurality of open-source caption files may be stored locally on the first user device. The system may preselect a first open-source caption file of the first plurality of open-source caption files based in part on the first event metadata. The system may access an audiovisual recorder of the first user device. The system may receive a live-streaming first feedback from the audiovisual recorder. In response to receiving the first feedback, the system may determine that at least a portion of the first open-source caption file matches the first feedback beyond a predetermined threshold. The system may determine a first synchronization between the first open-source caption file and the first feedback. The system may cause the first user device to display the first open-source caption file. The system may receive, a live-streaming first interruption from the audiovisual recorder. In response to the first user device receiving the first interruption, the system may pause captioning of the first event. The first interruption may be indicative of a loss of synchronization of the first open-source caption file with the first feedback. The system may receive a live-streaming second feedback from the audiovisual recorder. In response to receiving the second feedback, the system may determine that at least a portion of the first open-source caption file matches the second feedback beyond the predetermined threshold. The system may determine a second synchronization between the first open-source caption file and the second feedback. The system may then cause the first user device to display the first open-source caption file.

In some embodiments, determining one or more synchronizations of the first synchronization and the second synchronization may further include receiving, via the first user device, manual user feedback indicative of a preferred synchronization between a selected open-source caption file and the first feedback.

In some embodiments, the system may be further configured to receive, via the first user device, manual feedback indicative of a preferred synchronization between a selected open-source caption file and the first feedback. The system may identify a second user device associated with a second user attending the first event, and provide the preferred synchronization to the second user device.

In some embodiments, the system may be further configured to receive, from the first user device, a feedback frequency. The feedback frequency may be selected from a range between no feedback and continuous feedback.

In some embodiments, determining one or more synchronizations of the first and second synchronization may further include receiving the first feedback and the second feedback associated with the first event by a machine learning system. The system may improve caption synchronization, via the machine learning system, with respect to a related event based on the first feedback and the second feedback.

In some embodiments, the first event metadata may include a similarity score indicative of a predetermined similarity to each one of the first plurality of open-source caption files.

Some implementations of the disclosed technology will be described more fully with reference to the accompanying drawings. This disclosed technology, however, may be embodied in many different forms and should not be construed as limited to the implementations set forth herein. The components described hereinafter as making up various elements of the disclosed technology are intended to be illustrative and not restrictive. Many suitable components that could perform the same or similar functions as components described herein are intended to be embraced within the scope of the disclosed systems and methods. Such other components not described herein may include, but are not limited to, for example, components developed after development of the disclosed technology.

It is also to be understood that the mention of one or more method steps does not imply a particular order of operation or preclude the presence of additional method steps or intervening method steps between those steps expressly identified. Similarly, it is also to be understood that the mention of one or more components in a device or system does not preclude the presence of additional components or intervening components between those components expressly identified.

Example Use Cases

The following example use cases describe exemplary applications of a use of the systems and methods for live caption feedback described herein. It is intended solely for explanatory purposes and not to limit the disclosure in any way. A user may have purchased a ticket for a live event using an account or credit card associated with a particular financial service provider (e.g., financial service provider 450A). The system may receive event calendar data based on the purchase of the ticket for the live event. The system may determine what kind of event the user plans on attending based on the user's event calendar data, and download a first plurality of open-source caption files that are publicly available from one or more public caption file databases. The number of open-source caption files that are download as the first plurality may be based on user settings (e.g., a user may manually select the number of files to be downloaded). In some embodiments, the number of open-source caption files that are downloaded as the first plurality may be based on a number of available open-source caption file having a similarity score exceeding a predetermined threshold. The system may preselect a caption file that matches most closely to the content of the live event. Once the user arrives at the event, the system may request access to an audiovisual recording component of the first user device, and receive a live-streaming feedback from the event. Based on the feedback, the system may synchronize display of the caption file to the first user device so that the user may more readily enjoy the performance. For example, the user may be able to configure how the system displays the caption file to the first user device by inputting a number of words that the system should display simultaneously as part of the synchronization (e.g., a user may wish to have entire sentences of lyrics appear together, or perhaps the user wishes to only have 3-5 words displayed at a time). Additional variations are considered, such as receiving manual feedback from a first user device indicating a preferred synchronization of the caption file, and suggesting this preferred synchronization to at least a second user. In another variation, the system may receive an interruption from the audiovisual recording component of the first user device. The system may then pause captioning the event and wait to receive a second feedback indicating that the event has resumed, or that a user that had previously left the event has returned. Once the system has determined that the event has resumed, the system may then determine whether the preselected caption file still matches based on the second feedback. If it does, the system may then resynchronize the caption file for display on the first user device.

In another example, the system may have downloaded a first plurality of caption files based on the received event calendar data. After receiving a first feedback, the system may determine that none of the first plurality of caption files match the event. In this case, the system may use a mobile network to download at least one more caption file, determine that there is a match between it and the live event, and cause the first user device to display the synchronized one more caption file.

In another example, the system may determine a first caption file of the first plurality of caption files is a match to a first event attended by the first user. Based on the synchronization of the first caption file with the first event, the system may provide the first caption file to a second user attending the first event with the same synchronization as determined for the first user. Similarly, the system may provide the first caption file to a third user attending a second event when the second event has a similarity score beyond a predetermined threshold indicating a high similarity to the first event.

The specific configurations, machines, and the size and shape of various elements can be varied according to particular design specifications or constraints requiring user device(s) 430, financial service provider(s) 450, live caption feedback device 410, public database(s) 440, system 400, or methods 100, 200, and 300 to be constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain examples and implementations of the disclosed technology are described above with reference to block and flow diagrams of systems and methods and/or computer program products according to example examples or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some examples or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, examples or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some examples," "example embodiment," "various examples," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising," "containing," or "including" it is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A live caption feedback system comprising:
one or more processors; and
a memory in communication with the one or more processors and storing instructions that, when executed by the one or more processors, are configured to cause the system to:
receive, from a first user device, first event calendar data associated with a first event comprising first event metadata;
identify, based on the first event metadata, at least one song associated with the first event;
retrieve or receive, from one or more public databases and over a wireless network, a plurality of open-source caption files comprising lyrics related to the at least one song and associated with the first event, each of the plurality of open-source caption files being stored locally on the first user device;
generate a plurality of similarity scores indicative of a predetermined similarity by comparing the first event metadata to each of the plurality of open-source caption files;
preselect a first open-source caption file of the plurality of open-source caption files based in part on the plurality of similarity scores;
access an audiovisual recorder of the first user device;
receive a live-streaming first feedback from the audiovisual recorder;
responsive to receiving the first feedback, determine whether at least a portion of the first open-source caption file matches the first feedback beyond a predetermined threshold; and
when at least the portion of the first open-source caption file matches the first feedback beyond the predetermined threshold, (i) determine a first synchronization between the first open-source caption file and the first feedback, and (ii) provide, for display on the first user device, the first open-source caption file without accessing a mobile network.

2. The system of claim 1, wherein the instructions, when executed by the one or more processors, are further configured to cause the system to:
when at least the portion of the first open-source caption file does not match the first feedback beyond the predetermined threshold:
determine whether at least a portion of a second open-source caption file of the plurality of open-source caption files matches the first feedback beyond the predetermined threshold;
responsive to determining that at least the portion of the second open-source caption file matches the first feedback beyond the predetermined threshold, (i) determine a second synchronization between the second open-source caption file and the first feedback, and (ii) provide, for display on the first user device, the second open-source caption file without accessing a mobile network;
responsive to determining that at least the portion of the second open-source caption file does not match the first feedback beyond the predetermined threshold, (i) receive, over a mobile network, at least a third open-source caption file associated with the first event from one or more public databases, (ii) identify at least a portion of the third open-source caption file that matches the first feedback beyond the predetermined threshold, (iii) determine a third synchronization between the third open-source caption file and the first feedback, and (iv) provide, for display on the first user device, the third open-source caption file.

3. The system of claim 1, wherein the instructions, when executed by the one or more processors, are further configured to cause the system to:
receive, via the first user device, manual feedback indicative of a preferred synchronization between a selected open-source caption file and the first feedback;
identify a second user device associated with a second user attending the first event; and
provide the preferred synchronization to the second user device.

4. The system of claim 1, wherein the instructions, when executed by the one or more processors, are further configured to cause the system to:
receive, from the first user device, a feedback frequency, wherein the feedback frequency may be selected from a range between no feedback and continuous feedback.

5. The system of claim 2, wherein the instructions, when executed by the one or more processors, are further configured to cause the system to:
cause the first user device to receive at least the third open-source caption file over the mobile network only when neither the first synchronization nor the second synchronization match the first feedback beyond the predetermined threshold.

6. The system of claim 1, wherein the first event metadata comprises an artist and preselecting a first open-source caption file of the plurality of open-source caption files is based in part on matching an artist associated with the first open-source caption file to the artist of the first event metadata.

7. The system of claim 2, wherein determining one or more synchronizations of the first, second, and third synchronization further comprises:
receiving the first feedback associated with the first event by a machine learning system; and
improving caption synchronization, via the machine learning system, with respect to a related event based on the first feedback.

8. The system of claim 1, wherein the instructions, when executed by the one or more processors, are further configured to cause the system to:
extract characteristics of the first event metadata, wherein the extracted characteristics comprise a title, recording information, a portion of audio, or combinations thereof.

9. A first live caption feedback device comprising:
a first audiovisual recorder;
a network transceiver capable of transmitting and receiving electronic signals over a wireless network;
one or more processors housed in a body of the device; and
memory, in communication with the one or more processors, and storing instructions that, when executed by the one or more processors, are configured to cause the first live caption feedback device to:
parse first event calendar data associated with a first event comprising first event metadata;

identify, based on the first event metadata, at least one song associated with the first event;

retrieve or receive, from one or more public databases and over a wireless network, a plurality of open-source caption files comprising lyrics related to the at least one song and associated with the first event, each of the plurality of open-source caption files being stored locally on the first live caption feedback device;

generate a plurality of similarity scores indicative of a predetermined similarity by comparing the first event metadata to the plurality of open-source caption files;

preselect a first open-source caption file of the plurality of open-source caption files based in part on the plurality of similarity scores;

detect a live-streaming first feedback via the first audio-visual recorder;

responsive to detecting the first feedback, determine whether at least a portion of the first open-source caption file matches the first feedback beyond a predetermined threshold; and when at least the portion of the first open-source caption file matches the first feedback beyond the predetermined threshold, (i) determine a first synchronization between the first open-source caption file and the first feedback and (ii) display on the first live caption feedback device the first open-source caption file without accessing a mobile network.

10. The device of claim 9, wherein the instructions, when executed by the one or more processors, are further configured to cause the device to:

when at least the portion of the first open-source caption file does not match the first feedback beyond the predetermined threshold:

determine whether at least a portion of a second open-source caption file of the plurality of open-source caption files matches the first feedback beyond the predetermined threshold;

responsive to determining that at least the portion of the second open-source caption file matches the first feedback beyond the predetermined threshold, (i) determine a second synchronization between the second open-source caption file and the first feedback, and (ii) display on the first live caption feedback device the second open-source caption file without accessing a mobile network;

responsive to determining that at least the portion of the second open-source caption file does not match the first feedback beyond the predetermined threshold, (i) receive, over a mobile network and via the network transceiver, at least a third open-source caption file associated with the first event from one or more public databases, (ii) identify at least a portion of the third open-source caption file that matches the first feedback beyond the predetermined threshold, (iii) determine a third synchronization between the third open-source caption file and the first feedback, and (iv) display on the first live caption feedback device the third open-source caption file.

11. The device of claim 9, wherein the instructions, when executed by the one or more processors, are further configured to cause the device to:

receive, by the first live caption feedback device, manual feedback indicative of a preferred synchronization between a selected open-source caption file and the first feedback;

identify a second live caption feedback device associated with a second user attending the first event; and provide the preferred synchronization to the second live caption feedback device.

12. The device of claim 9, wherein the instructions, when executed by the one or more processors, are further configured to cause the device to:

receive a feedback frequency wherein the feedback frequency may be selected from a range between no feedback and continuous feedback.

13. The device of claim 10, wherein the live caption feedback device receives at least the third open-source caption file over the mobile network only when neither the first synchronization nor the second synchronization match the first feedback beyond the predetermined threshold.

14. The device of claim 9, wherein the first event metadata further comprises a similarity score indicative of a predetermined similarity to each one of the plurality of open-source caption files.

15. The device of claim 10, wherein determining one or more synchronizations of the first, second, and third synchronization further comprises:

receiving the first feedback associated with the first event by a machine learning system; and improving caption synchronization, via the machine learning system, with respect to a related event based on the first feedback.

16. A live caption feedback system comprising:
one or more processors; and
a memory in communication with the one or more processors and storing instructions that, when executed by the one or more processors, are configured to cause the system to:

receive, from a first user device, first event calendar data associated with a first event comprising first event metadata;

identify, based on the first event metadata, at least one song associated with the first event;

retrieve or receive, from one or more public databases and over a wireless network, a plurality of open-source caption files comprising lyrics related to the at least one song and associated with the first event, each of the plurality of open-source caption files being stored locally on the first user device;

generate a plurality of similarity scores indicative of a predetermined similarity by comparing the first event metadata to the plurality of open-source caption files;

preselect a first open-source caption file of the plurality of open-source caption files based in part on the plurality of similarity scores;

access an audiovisual recorder of the first user device;

receive a live-streaming first feedback from the audiovisual recorder;

responsive to receiving the first feedback, determine that at least a portion of the first open-source caption file matches the first feedback beyond a predetermined threshold;

determine a first synchronization between the first open-source caption file and the first feedback;

cause the first user device to display the first open-source caption file;

receive, a live-streaming first interruption from the audiovisual recorder; and responsive to the first user device receiving the first interruption, pause captioning of the first event.

17. The system of claim 16, wherein the instructions, when executed by the one or more processors, are further configured to cause the system to:

receive a live-streaming second feedback from the audio-visual recorder;

responsive to receiving the second feedback, determine that at least a portion of the first open-source caption file matches the second feedback beyond the predetermined threshold;

determine a second synchronization between the first open-source caption file and the second feedback; and cause the first user device to display the first open-source caption file.

18. The system of claim 17, wherein determining one or more synchronizations of the first synchronization and the second synchronization further comprises receiving, via the first user device, manual user feedback indicative of a preferred synchronization between a selected open-source caption file and the first feedback.

19. The system of claim 16, wherein the instructions, when executed by the one or more processors, are further configured to cause the system to:

receive, via the first user device, manual feedback indicative of a preferred synchronization between a selected open-source caption file and the first feedback;

identify a second user device associated with a second user attending the first event; and provide the preferred synchronization to the second user device.

20. The system of claim 16, wherein the instructions, when executed by the one or more processors, are further configured to cause the system to:

receive, from the first user device, a feedback frequency, a feedback frequency, wherein the feedback frequency may be selected from a range between no feedback and continuous feedback.

21. The system of claim 17, wherein determining one or more synchronizations of the first and second synchronization further comprises:

receiving the first feedback and the second feedback associated with the first event by a machine learning system; and improving caption synchronization, via the machine learning system, with respect to a related event based on the first feedback and the second feedback.

* * * * *